(12) United States Patent
Frazer

(10) Patent No.: US 9,017,042 B2
(45) Date of Patent: Apr. 28, 2015

(54) MULTI-STAGE PUMP SYSTEM

(76) Inventor: Rob Frazer, Murray Bridge (AU)

( * ) Notice: Subject to any disclaimer, the term of this patent is extended or adjusted under 35 U.S.C. 154(b) by 640 days.

(21) Appl. No.: 13/168,900

(22) Filed: Jun. 24, 2011

(65) Prior Publication Data
US 2012/0000837 A1    Jan. 5, 2012

Related U.S. Application Data

(63) Continuation-in-part of application No. PCT/AU2009/001710, filed on Dec. 24, 2009.

(30) Foreign Application Priority Data

Dec. 24, 2008 (AU) ................ 2008906663

(51) Int. Cl.
| | |
|---|---|
| F04B 17/00 | (2006.01) |
| F04B 23/10 | (2006.01) |
| B01D 61/10 | (2006.01) |
| F03B 13/14 | (2006.01) |
| F03B 13/18 | (2006.01) |
| F03B 13/24 | (2006.01) |
| F04B 23/04 | (2006.01) |
| F04B 25/00 | (2006.01) |
| F04B 43/00 | (2006.01) |
| F04B 45/02 | (2006.01) |
| C02F 1/44 | (2006.01) |
| C02F 103/08 | (2006.01) |

(52) U.S. Cl.
CPC ......... *F04B 23/106* (2013.01); *B01D 61/10* (2013.01); *F03B 13/142* (2013.01); *F03B 13/145* (2013.01); *F03B 13/189* (2013.01); *F03B 13/24* (2013.01); *F04B 23/04* (2013.01); *F04B 25/005* (2013.01); *F04B 43/0054* (2013.01); *F04B 45/02* (2013.01); *B01D 2313/243* (2013.01); *C02F 1/441* (2013.01); *C02F 2103/08* (2013.01); *F05B 2220/62* (2013.01); *Y02E 10/32* (2013.01); *Y02E 10/38* (2013.01)

(58) Field of Classification Search
CPC ..................................... F04B 35/004
USPC ............ 417/330, 331, 332, 333, 334; 290/42, 290/53
See application file for complete search history.

(56) References Cited

U.S. PATENT DOCUMENTS

| | | | |
|---|---|---|---|
| 929,982 A | * | 8/1909 | Ransom .................. 417/328 |
| 3,952,517 A | | 4/1976 | Decker |

(Continued)

FOREIGN PATENT DOCUMENTS

| | | |
|---|---|---|
| EP | 0265594 | 4/1992 |
| WO | WO 86/01259 | 2/1986 |

*Primary Examiner* — Christopher Bobish
(74) *Attorney, Agent, or Firm* — Darren Gardner

(57) ABSTRACT

A multi-stage pump system for use in desalination systems including a first stage S1 providing low pressure for priming the system a second stage S2 that is in fluid communication with the first stage and is primed by the low pressure from the first stage. The second stage S2B includes at least one reciprocating piston 122, in an enclosing cylinder 121, 121A and is attached to the two second flexible inflatable bladders 123. The piston 122 will move up and down within the cylinder 121 121A relative to the movement of the two second stage flexible bladders 123 due to priming by the first stage affecting their buoyancy. The driving fluid then passes into a passage 130 and is expelled to an outlet and Stage three (S3) at higher pressure when the first reciprocating member 122 proceeds through a complete stroke.

20 Claims, 39 Drawing Sheets

(56) References Cited

U.S. PATENT DOCUMENTS 5,394,695 A * 3/1995 Sieber .............................. 60/398
6,203,696 B1    3/2001 Pearson
6,392,314 B1 *  5/2002 Dick ............................... 290/53

* cited by examiner

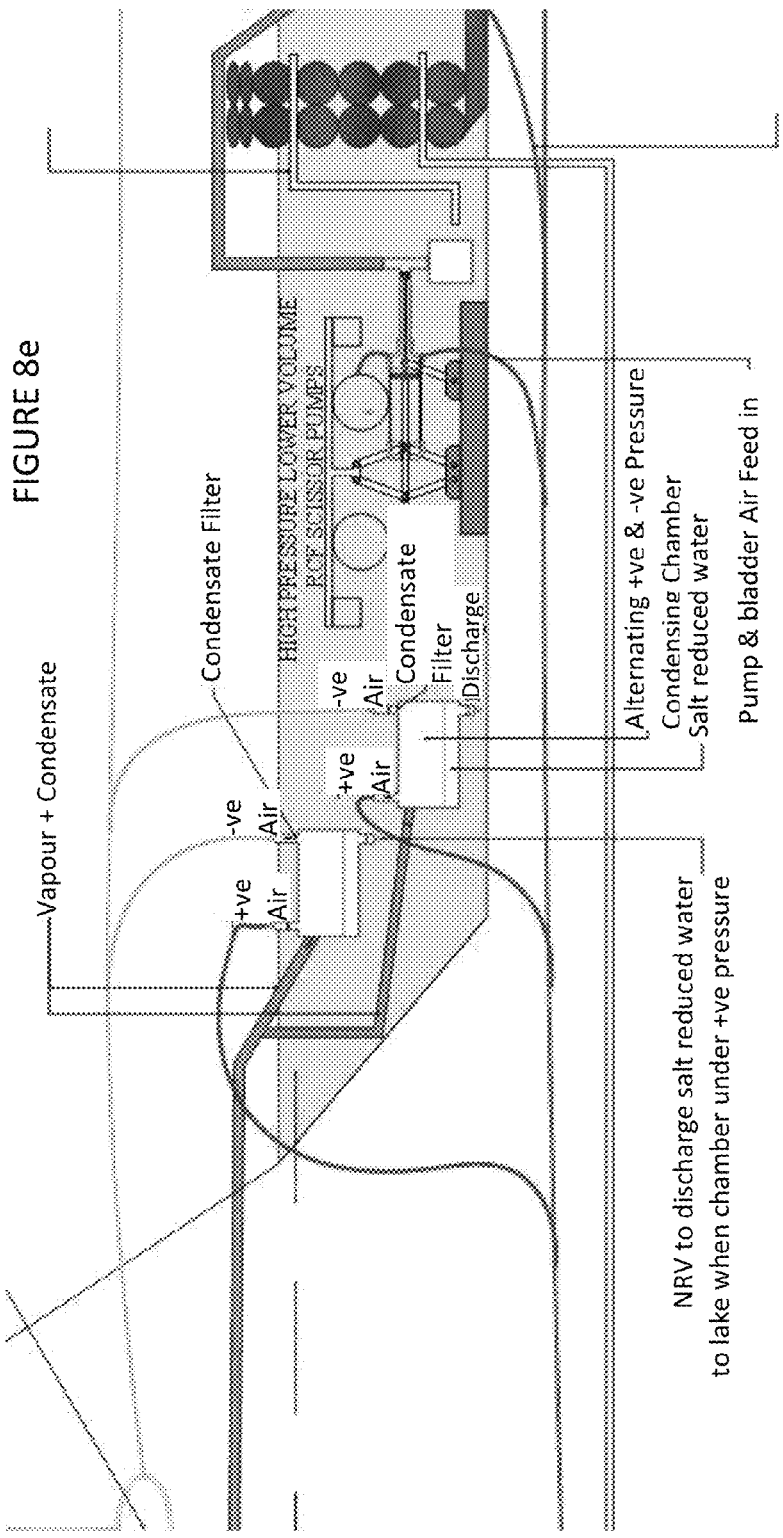

US 9,017,042 B2

MULTI-STAGE PUMP SYSTEM

CROSS-REFERENCE TO RELATED APPLICATIONS

This application is a continuation-in-part of and claims priority under 35 U.S.C. §120 and §365(c) from International Application PCT/AU2009/001710, incorporated herein by reference, with an international filing date of Dec. 24, 2009 and published as WO 2010/071948, which claims priority to Australian application no. 2008906663 filed Dec. 24, 2008.

FIELD OF THE INVENTION

This invention relates to a multi-stage pump system for use in desalination systems and pump apparatus for use in such multi-stage pump system and in particular to pumps that can be used when submerged (e.g., wholly, partially) in a body of liquid.

BACKGROUND TO THE INVENTION

The need for clean drinkable water has increased over the last century. In the last fifty years, the desalination of sea or brackish water has improved such that it is becoming an affordable option for nations that are in need of fresh water.

A primary problem with a desalinisation process is the movement of the water offshore to a processing plant on the land. Another is the costs of developing high water pressures. One of the more effective methods to do this involves the use of pumps. The use of powered pumps is the most common practice. This will add to the overhead costs of the process as electricity will be needed to drive these pumps. Depending on the volume of water needed, multiple pumps are sometimes needed, which increases the power overhead costs with each pump that is used. The high energy consumed to achieve the high pressures used in reverse osmosis plants is another concern. The high pressure is required to force the fluid pumped through small membrane filters during the filtering process.

On a smaller scale, hand pumps can be used to draw water from the water source. This is inefficient and the return for the effort put in generally is only enough for a small amount of people which restricts this method of drawing water greatly depending on the amount of water needed.

For both these methods, there is the potential for build up of brine concentrate at the outfall (e.g., outlet, exit) location, with potential associated stratification and anoxia, particularly in areas of lesser wave/tide/current activity with restricted circulation.

Accordingly, it is an object of the present invention to overcome or at least substantially ameliorate one or more of the disadvantages of the prior art.

SUMMARY OF THE INVENTION

In accordance with the invention there is provided a pump apparatus for use in a multi-stage pump system for use in a desalination system that includes multiple stages wherein the first stage includes a combination of a plurality of bellows, cylinders and pistons connected to a buoyancy system that moves up and down according to wave motion and/or swell motion of the water that draws air from the atmosphere to provide a compressed air source for priming subsequent stages.

The pump apparatus for use in a multi-stage pump system can include multiple stages wherein one stage that receives gas from an outside source includes a cylinder including a reciprocating piston attached to and in fluid communication with a flexible bladder that is inflated by the low pressure gas and deflates when the gas is forced toward the cylinder such that an complete stroke of the piston includes air flowing from the outside source into the flexible bladder, inflating it and increasing the buoyancy of the bladder, drawing it and the piston up, once the bladder has risen to the apex, the bladder will deflate, forcing air into the cylinder augmented by air from previous stages and push the piston down this complete stroke creates a pumping force to draw water into the cylinder through an inlet port and then expel it through an outlet port outputting to use or further stages.

The present invention in one aspect provides a apparatus for use in a multi-stage pump system for use in desalination systems that includes: a first stage for priming the system; a second stage that is in fluid communication with the first stage and is primed by the low pressure air from the first stage wherein the second stage drives a first reciprocating member through a stroke to create an increased pressure; and wherein the second stage having an inlet point for drawing fluid from a fluid source when the first reciprocating member undergoes a stroke, the fluid then passes through a passage to and expelled to an outlet point at higher pressure when the first reciprocating member proceeds through a complete stroke.

The first stage includes reciprocating pistons in cylinders where the pistons are attached to buoyancy vessels such as floats, such that the pistons will move up and down relative to the movement of the floats relative to wave action and/or swell on the body of liquid priming the first stage.

The first stage can include a first flexible bladder that can be partly or fully inflated and deflated.

The second stage can include a second flexible bladder that can be partly or fully inflated and deflated.

Fluid communication between the first stage and the second stage bladder is achieved though connection means.

The pressure generated by the first stage is substantially in the range of 4 psi to 40 psi.

The pressure generated by the second stage, including utilisation of inflation and deflation of the second flexible bladder, is substantially in the range of 40 psi to 200 psi.

The pumping system includes a third stage that that is in fluid communication with both the first stage and second stage, wherein the third stage drives a second reciprocating member through a stroke.

The third stage includes a third flexible bladder that can be partly or fully inflated and deflated.

The pressure generated by the third stage, including utilisation of inflation and deflation of the third flexible bladder, is substantially in the range of 500 psi to 800 psi.

The fluid communication between the first stage and the second stage and the third stage is achieved though connection means The connection means are flexible tubing.

The pumping system is driven by a driving fluid.

The driving fluid can be a gas. The gas has a density lower than water.

The driving fluid can be a liquid.

The flexible bladders are formed from a buoyant material.

Valves are used to regulate the flow of the driving fluid to control pressures in the pumping system.

The pump is anchored to the bed of the fluid source.

The pump includes frames to provide support to the first stage, the second stage and the third stage and the connection means.

The fluid is carried in a fluid transmission pipeline.

The present invention provides a pump apparatus for use in a multi-stage pump system for use in desalination systems that includes: a first stage, including a combination of one or more bellows and reciprocating pistons connected to a buoyancy system that moves up and down according to wave motion of the water, that draws air from an air source such as the atmosphere to provide a compressed air source; a combination of a fixed or flexible bladder in fluid communication with the compressed air source; and a cylinder including a reciprocating piston attached to and in fluid communication with a fixed or flexible bladder such that when submerged in a body of water, the reciprocating piston moves up and down according to the buoyancy of the flexible bladder being primed by the first stage and the pressure of air being forced into the cylinder from the first stage, and is then directed towards both the lower piston and to the flexible bladder in turn, to force the piston in the cylinder through a stroke motion creating a pumping force to draw water into the cylinder through an inlet port and then expel it through an outlet port.

The present invention can provide a pump apparatus for use in a multi-stage pump system for use in a desalination system that includes multiple stages wherein the first stage includes a combination of a plurality of bellows, cylinders and pistons connected to a buoyancy system that moves up and down according to wave motion of the water that draws air from the atmosphere to provide a compressed air source for priming subsequent stages.

The present invention provides a pump apparatus for use in a multi-stage pump system that includes multiple stages wherein one stage that receives gas from an outside source includes a cylinder including a reciprocating piston attached to and in fluid communication with a flexible bladder that is inflated by the low pressure gas and deflates when the gas is forced toward the cylinder such that an complete stroke of the piston includes air flowing from the outside source into the flexible bladder, inflating it and increasing the buoyancy of the bladder, drawing it and the piston up, once the bladder has risen to the apex, the bladder will deflate, forcing air into the cylinder augmented by air from previous stages and push the piston down this complete stroke creates a pumping force to draw water into the cylinder through an inlet port and then expel it through an outlet port outputting to use or further stages.

The stage is supported by a frame.

Alternatively, the first, second and third flexible bladders can all be fixed bladders. This will require an alternative plumbing system.

BRIEF DESCRIPTION OF THE DRAWINGS

In order that the invention can be more readily understood embodiments will be described as non-limiting examples of specific preferred embodiments of the invention with reference to the drawings wherein:

In FIG. 2A the stroke of the pump apparatus for use in a multi-stage pump system at bottom dead centre with the bladder deflated;

In FIG. 2B the stroke of the pump apparatus at bottom dead centre with the bladder inflated and about to rise;

In FIG. 2C the stroke of the pump apparatus at mid-stroke;

In FIG. 2D the stroke of the pump apparatus at three quarters lift height and the bladder starting to deflate;

In FIG. 2E the stroke of the pump apparatus at top dead centre with the bladder deflating;

In FIG. 2F the stroke of the pump apparatus at top dead centre with the about to start moving down with the bladder deflating;

In FIG. 2G the stroke of the pump apparatus at partial downward stroke with the bladder completely deflated;

In FIG. 2H the stroke of the pump apparatus at three quarters of the downward stroke complete with the bladder completely deflated;

In FIG. 3A the stroke of the pump apparatus for use in a multi-stage pump system deflated according to a second embodiment of the invention with stroke at bottom dead centre with the bladder;

In FIG. 3B the stroke of the pump apparatus with stroke at bottom dead centre with the bladder inflating and about to rise;

In FIG. 3C the stroke of the pump apparatus at bottom inflating the bladder and rising;

In FIG. 3D the stroke of the pump apparatus at mid-stroke lift height and the bladder continuing to inflate and going up;

In FIG. 3E the stroke of the pump apparatus at nominally three quarters up stroke with the bladder inflated and going up;

In FIG. 3F the stroke of the pump apparatus at top with bladder inflated and starting to deflate and stroke about to start moving down with the bladder deflating;

In FIG. 3G the stroke of the pump apparatus at top of stroke with the bladder deflating and starting to go down;

In FIG. 3H the stroke of the pump apparatus at mid-stroke of the downward stroke with the bladder deflating and going down;

In FIG. 3I the stroke of the pump apparatus at nominally 95% of the downward stroke complete with the bladder deflated and going down; and In FIG. 3J the stroke of the pump apparatus at dead set bottom with the downward stroke complete with the bladder completely deflated ready to repeat cycle.

FIGS. 8d-8f are enlarged portions of the bottom-most diagram of FIG. 8 and may be concatenated to form the bottom-most diagram of FIG. 8;

DETAILED DESCRIPTION OF THE PREFERRED EMBODIMENTS

In a first of the preferred embodiments, the invention provides a pump for use in a desalination system. In this regard use of power from the water to be desalinated provides improved energy consumption. The system includes multiple stages that are partly or fully submerged in a tidal body of water such as the ocean.

Figure 1:
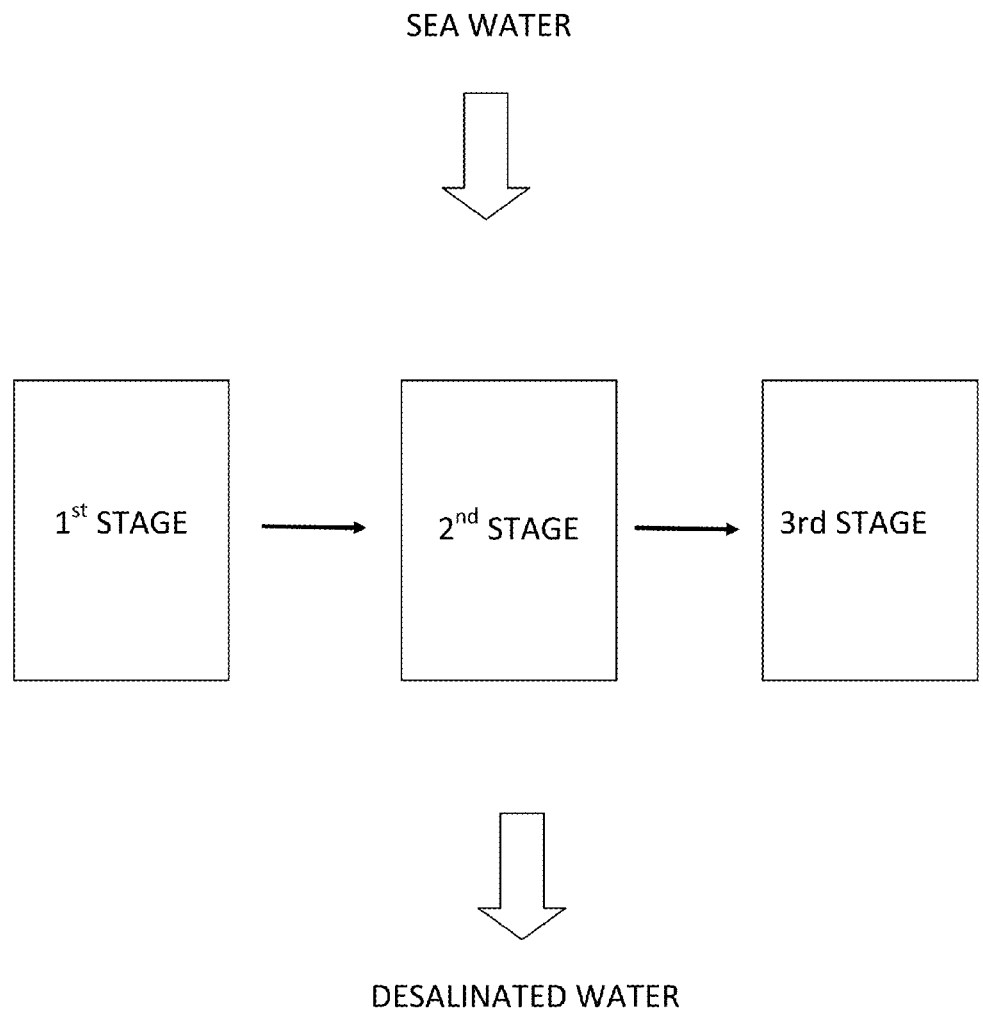
FIG. 1 is a diagrammatic view of a method of desalination using a multi stage pump system.

Referring to the first embodiment shown in FIG. 1 in which the primed pressure (e.g., priming pressure, priming fluid) can be gas or liquid. The implementation includes a first stage (e.g., $1^{st}$ stage), a second stage (e.g., $2^{nd}$ stage), and a third stage (e.g., $3^{rd}$ stage). The first stage provides priming for use in a method of desalination using a multi-stage pump system for use in desalination systems. The first stage provides low pressure for priming the system.

The second stage is in fluid communication with the first stage. The second stage is primed by the low pressure (e.g., fluid, air) from the first stage. The second stage receives sea water for desalination. The second stage includes a first reciprocating member (e.g., piston, rod). The second stage includes an inlet point for drawing fluid from a fluid source (e.g., sea, ocean, pond) when the first reciprocating member undergoes (e.g., starts, begins, commences) a stroke. The fluid drawn from the fluid source passes through a passage and is expelled to an outlet of the second stage at higher pressure when the first reciprocating member proceeds through (e.g., completes, terminates, finishes) a complete stroke. This can be used in a third stage.

A reciprocating member may move forward and backward, with respect to the pump, in a plane. The plane of movement of a reciprocating member may be oriented with respect to a force of gravity. In an implementation, the plane of movement of a reciprocating member is oriented substantially parallel to the force of gravity, so the reciprocating member moves in a substantially vertical direction. In another implementation, the plane of movement of the reciprocating member moves in a substantially horizontal direction, so the reciprocating member moves in a substantially horizontal direction.

In an implementation, shown in FIGS. 4 to 9, the first stage may include wave and/or swell motion pumps located in a coastal sea water and pumps water to a series of pipe columns whereby the rise and fall within these pipe columns generates both positive and negative air pressure. The positive air pressure is utilised to drive the first of the second stage pumps as described earlier. The first of these second stage pumps pump saline water through heat exchangers located within the first of a series of high salinity, super saturated, high temperature solar ponds with an inverted thermal gradient. This pre- heated saline water continues to a partial vacuum chamber created by the negative pressure side of the pipe columns, where it is pushed through atomising jets within a partial vacuum environment. The resultant water vapour is continually drawn into alternating positive and negative pressure condensing chambers, located within the cooler ambient temperature waters outside of the higher temperature solar ponds, thus providing a form of vacuum distillation.

Figure 8:
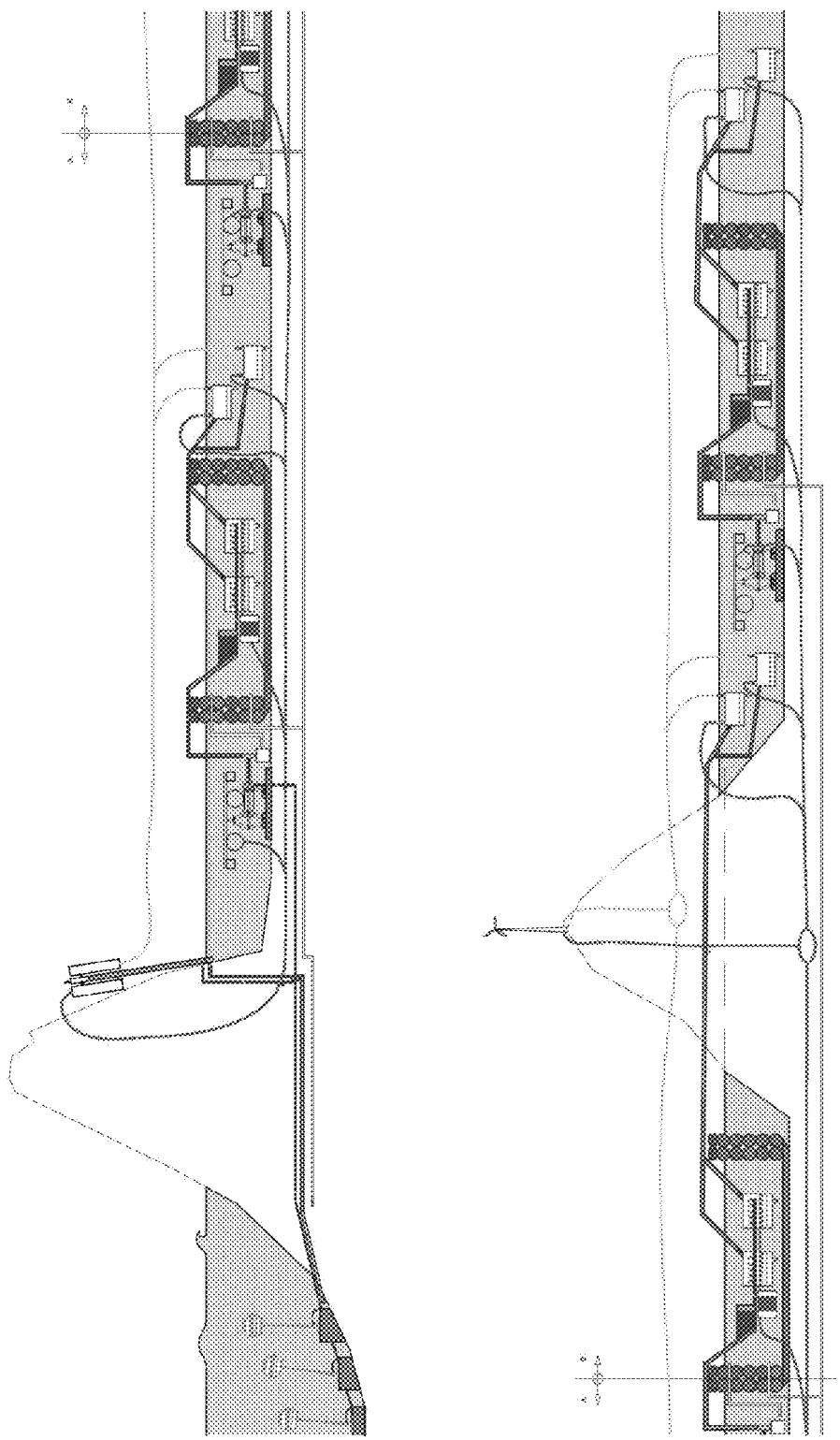
FIG. 8 is a diagrammatic view of an embodiment of the invention illustrating Stage 1, Stage 2 and Stage 3 to convert salt water to freshwater for use in a method of desalination using a multi stage pump system of FIG. 1.

In the example used in FIG. 8 there are several stages of vacuum distillation utilising heat exchange and vaporising processes in combination with salinity and thermal gradient solar ponds.

In one form of the preferred embodiment, the following stages are presented:

Stage One (S1)

Stage one (S1) that is used in a multi-stage pump system for use in desalination systems includes:

Air supply is primed by a plurality of bellows, cylinders and pistons that draw air from the atmosphere.

Each cylinder and piston is connected to a buoyancy system that moves up and down by wave motion of the water. This buoyancy system includes flexible bladders for automatic optimisation of the wave energy applicable at the time.

Similarly with each set of bellows, up and down float movement results in respective piston movement in cylinder, priming the first stage.

Flexible tubes provide fluid communication between stage one with stages two and three such that the air taken from the atmosphere can be sent to the two other stages.

This stage creates a pressure substantially in the range of 4 to 40 psi.

Stage 2—Example a)

A pump apparatus that is used in a Stage 2 of a multi-stage pump system for use in desalination systems receives from the first stage, including a combination of one or more bellows and reciprocating pistons connected to a buoyancy system that moves up and down according to wave and/or swell motion of the water, that draws air from an air source such as the atmosphere to provide a compressed air source; there is provided a combination of a fixed or flexible bladder in fluid communication with the compressed air source; and a cylinder including a reciprocating piston attached to and in fluid communication with a fixed or flexible bladder such that when submerged in a body of water, the reciprocating piston moves up and down according to the buoyancy of the flexible bladder being primed by the first stage and the pressure of air being forced into the cylinder from the first stage, and is then directed towards both the lower piston and to the flexible bladder in turn, to force the piston in the cylinder through a stroke motion creating a pumping force to draw water into the cylinder through an inlet port and then expel it through an outlet port.

Stage Two (S2), as Shown in FIGS. 2A to 2H, Includes

A cylinder, 21, and piston, 22, arrangement that is primed by the first stage (S1).

A flexible bladder, 23, is inflated from air from the first stage.

The bladder is in fluid communication with the cylinder 21 by flexible tubes, 24.

The flexible bladder is buoyant when partly or fully inflated.

A series of valves that controls if the air from stage one is directed to the bladder or the cylinder and piston. Other valves control the flow of the air from the bladder to the cylinder, the cylinder to the bladder, and the cylinder to the piston.

A purging system is incorporated into this to purge the air system of any water ingress as required.

Fluid is taken in through an inlet from a fluid transmission pipeline including both in-line and off-line storage, due to the pistons downward motion during the stroke. The pistons upward motion during the stroke will propel it further along the pipeline, toward stage three.

The fluid is forced toward a third stage during the pistons up stroke

The pressure is increased to a range substantially in the range of 40 to 200 psi.

A series of valves that regulate the flow of the air from the first stage to either the cylinder and piston or the flexible bladder.

Stage two is mounted to a vertical frame to provide stability to the above features.

Stage Three (S3), also Includes

A cylinder and piston arrangement that is primed by the second stage.

The bladder is in fluid communication with the cylinder in the form of flexible tubes.

Fluid is drawn toward stage three from stage two through the fluid transmission pipeline from the pistons downward motion during the stroke. The pistons upward motion during the stroke will propel it further along the fluid transmission pipeline, toward an outlet point.

The pressure is increased to a range substantially in the range of 500 to 800 psi.

A series of valves regulate the flow of the air from the first stage to either the cylinder and piston or the flexible bladder.

It is evident that structurally, stage 2 and 3 can be very similar in principle and construction. Variations include the use of a fixed flotation bladder if the primary purpose of Stage 3 is to amplify water pressures. However if re-oxygenation is of primary concern, a floating flexible bladder can be utilised.

Stage one is in fluid communication with primarily stage two such that the air taken from stage one can be distributed to stages two and three. The fluid communication is achieved through connection means in the form of flexible tubes.

Air flow within the system is regulated by a plurality of valves. The valves control whether the gas flows to the piston and cylinder or to the flexible bladder is stages two and three. Some valves are non return valves, 25, while others in use are diaphragm valves. Other valves within stage two and three regulate the flow to and from the bladder and to and from the cylinder and piston.

The pistons, 22, in both stage two and three include a sealed upper and lower limit. This seal can be achieved with a combination of piston cups and "O" rings, 27, which prevents liquid from filling the cylinder, 21, between the extreme ends of the piston, and also prevent air from escaping.

The second stage of the system is held by anchor 28 below water in the ocean. Each stage within the entire system is mounted to an elongated frame 29 aligned vertically, to provide stability to the components.

The inlet point is located at the end of the fluid transmission pipeline, 30, including both in-line and off-line storage, that carries sea water from the ocean to the outlet point at the other end of the fluid transmission pipeline. This fluid transmission pipeline includes a plurality of non return valves to prevent back flow of the liquid that is being pumped.

In use, an air supply that is part of Stage one (S1) is primed as a result of at least one piston being driven through a stroke within a cylinder, and/or at least one set of bellows. At least one piston is attached to a float that moves up and down according to wave and/or swell motion of the ocean. This will draw in air from the atmosphere that will be used to drive the system.

With respect to Stage two (S2), the complete stroke of the cylinder is shown in FIGS. 2A through 2H. The cycle commences at cycle step 1 as shown in FIG. 1. This cycle is considered to start after a period of dormancy following a storm for example. In this situation, Stage 2 has lain dormant at the bottom of its stroke and with the flotation bladder deflated for an indefinite period of time.

| Cycle step | bladder | Stroke Position/motion | Pressure Upper/lower cyl | fluid |
| --- | --- | --- | --- | --- |
| 1 | deflated | bottom/— | —/— | In 30 |
| 2 | inflated | bottom/rising | HI/MED | Out of 30 |
| 3 | inflated | mid/rising | HI/MED | Out of 30 |
| 4 | inflated | ¾ up/rising | HI/MED | Out of 30 |
| 5 | inflated | top/— | —/— | — |
| 6 | deflated | top/falling | LO/HI | into 30 |
| 7 | deflated | mid/falling | LO/HI | Into 30 |
| 8 | deflated | ¾/falling | LO/HI | Into 30 |

For the purposes of the following description, the following abbreviations will be used:

BEV—Bladder Exhaust Valve (31)
BIV—Bladder Inlet Valve (22A)
BPA—Bladder and Piston Assembly (23,22A,22)
FB—Flotation Bladder (23)
LLC—Larger Lower Cylinder (21)
LLP—Larger Lower Piston (incl. larger single cup) (22)
SUC—Smaller Upper Cylinder (21A)
SUP—Smaller Upper Piston (incl. smaller double cups) (22A)

Figure 2A:
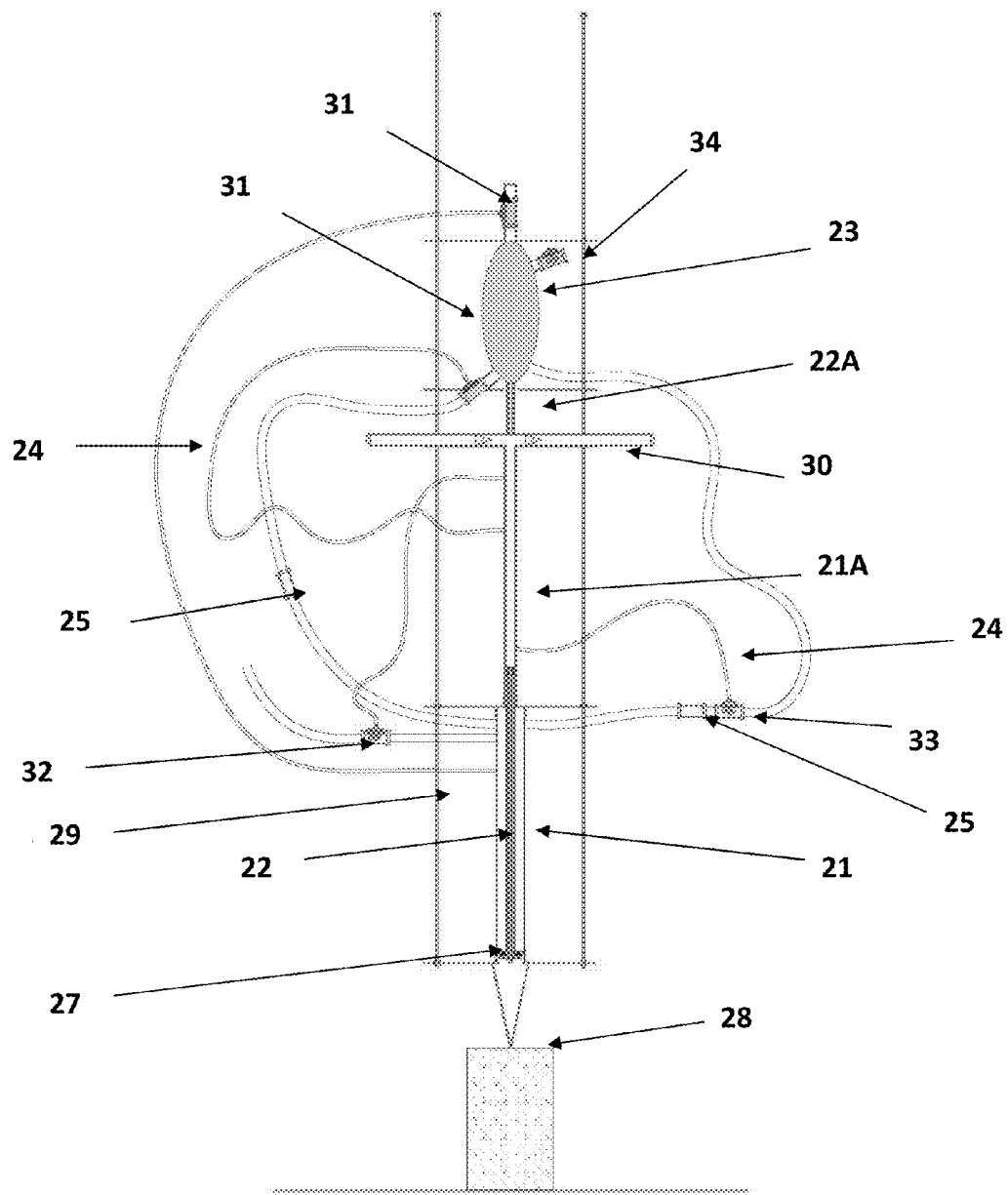
FIGS. 2A to 2H are operational phases of a Stage 2 pump according to a first embodiment of the invention for use in a multi stage pump system, such as in a method of desalination of FIG. 1, where the operating pistons are aligned vertically, where sufficient depth of water is available.

According to FIG. 2A, air is pumped from Stage 1, into the larger lower cylinder, 21, (LLC) of Stage 2. This builds up air pressure in the top of the LLC which in turn continues through and starts to inflate the flotation bladder, 23, (FB). At this stage, water may still be entrapped within the LLC, which may have entered during the preceding period of dormancy. This water will be purged later. During this part of the stroke, the Main air supply valve, 32, is open.

Figure 2B:
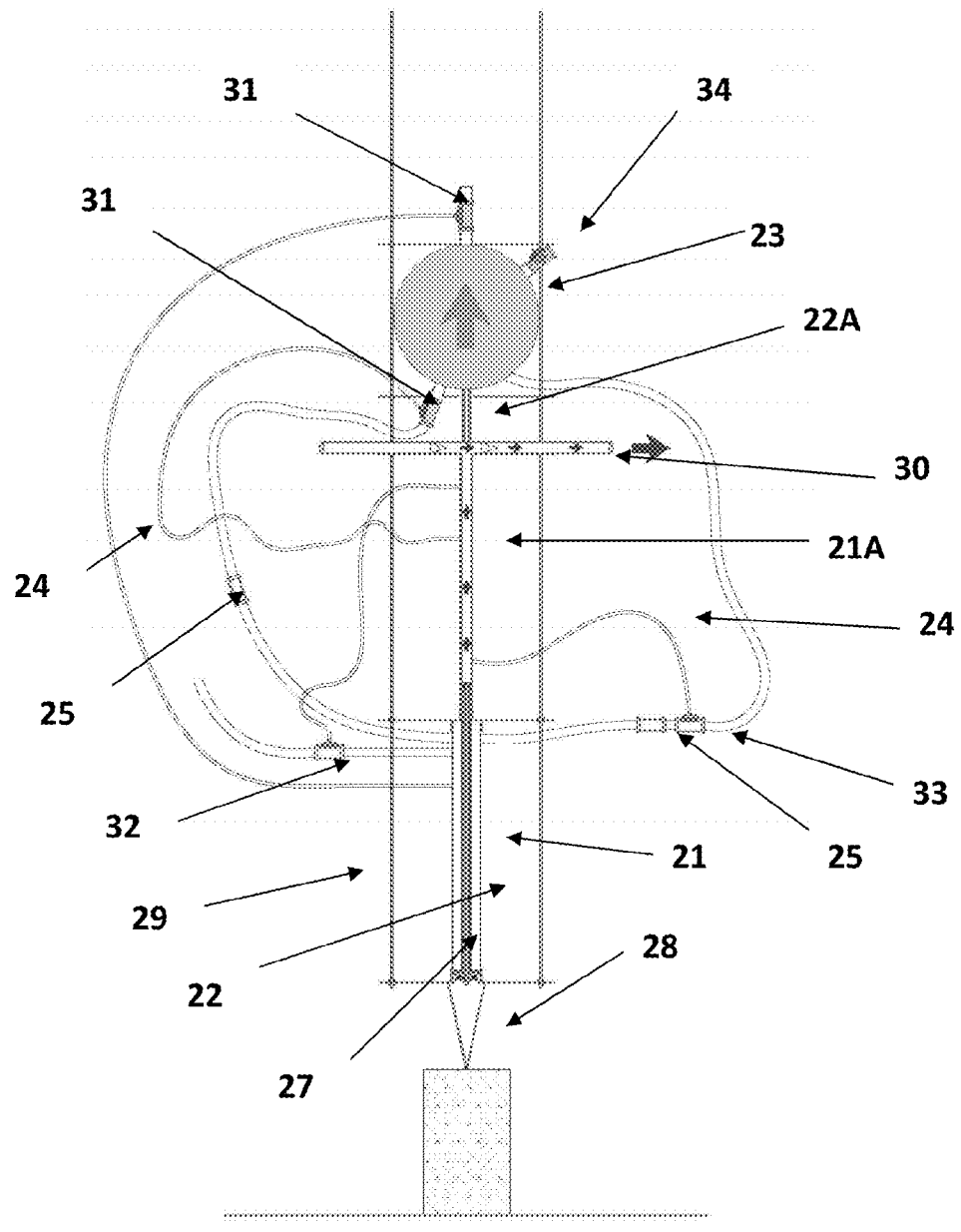

With reference to FIG. 2B, as the air pressure builds up, the FB continues to inflate until the buoyant force exceeds the force generated by the air pressure in the Larger Lower Cylinder 21 (LLC) previously holding the larger lower piston 22, (LLP) down at the bottom of its stroke. It is during this time that the bladder and piston assembly 23, 22A, 22 (BPA) slowly begins to rise. At this stage the smaller upper cylinder (SUC) 21A is charged with water (and has been so, continuously, during the preceding period of dormancy).

As the BPA rises, the smaller upper piston cups are forced downward onto their seat by the water pressure within the Smaller Upper Cylinder 21A (SUC), as this piston pumps water from the SUC. This in turn opens the bottom tri-valves (27) housed within the larger lower piston cup, which releases the pressure within the LLC. This will serve two purposes, initially it will purge the LLC of entrapped water within that cylinder, and secondly it will enable almost the full buoyant force from the inflated Flotation Bladder 23 (FB) to be applied to the smaller upper piston 21A (SUP), and consequently pump water out through the rising main 30.

The bottom tri-valves are adjustable, with some restriction required to ensure some low to moderate pressure remains in the LLC, necessary for keeping the bladder exhaust valve, 31, (BEV) closed. The higher pressure water being pumped through the rising main ensures that the return-air/water purging valve from the FB to ensure no air is released from the FB. The main air supply valve, 32, is also closed to ensure no further air pressure is in the LLC during the up-stroke, and the FB air supply valve, 33, to ensure the FB does not over-inflate. At this point the main air supply valve, 32, is closed, the bladder exhaust valve, 31, is closed and the bladder air supply valve, 33, is closed.

Figure 2C:
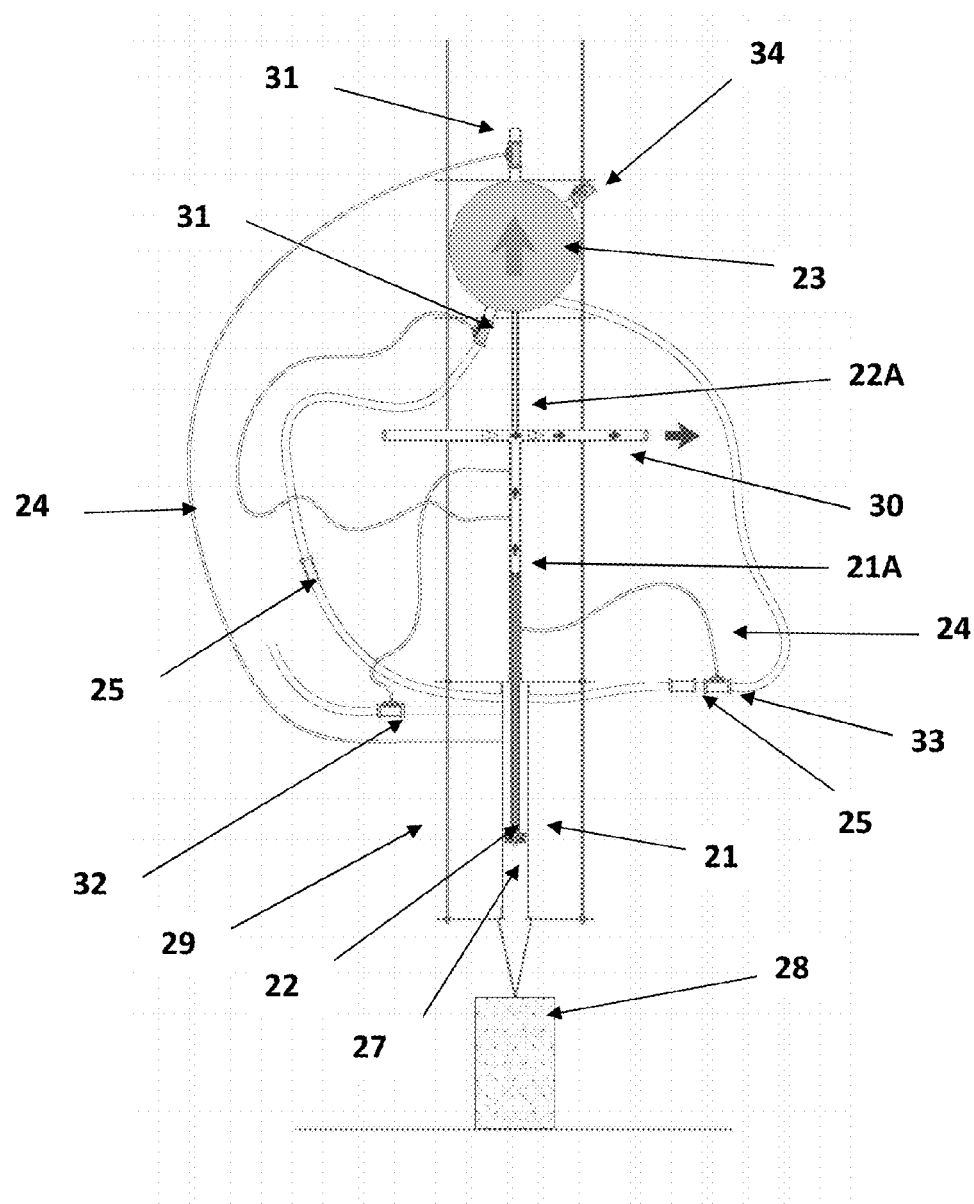

FIG. 2C shows the next stage in the stroke where the BPA continues to rise. By this Time the SUP has risen past the port normally triggering the FB air supply valve. Since there is essentially the same pressure on each side of the diaphragm in this valve, this valve still remains closed, even though its trigger port has been passed. The FB will continue to expand during this up-stroke, even though not receiving any air, due to the reduced confining pressure of the water as the FB rises closer to the surface. This increases the buoyant force, increasing the water pressure in the rising main. At this point the main air supply valve, 32, is closed, the bladder exhaust valve, 31, is closed and the bladder air supply valve, 33, is open.

Figure 2D:
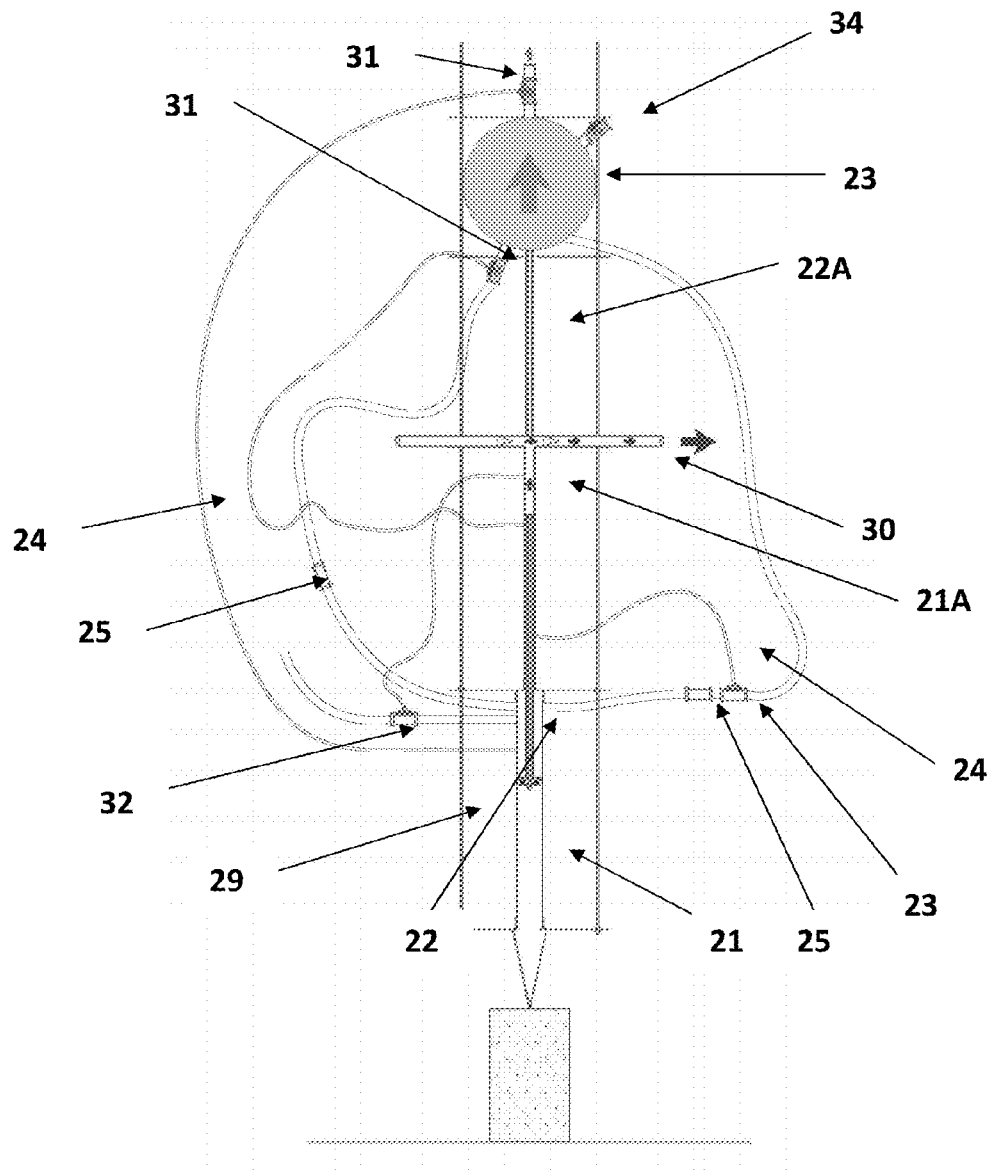

Considering FIG. 2D, during this stage of the stroke, the BPA continues to rise. The SUP has risen past the port normally triggering the return air/water purging valve from the FB. Since the air pressure in the FB at this stage is slightly higher than in the LLC, air returns from the FB to begin precharging the LLC which will result in the slow deflation of the FB.

The slow deflation of the FB, coupled with the precharging of the LLC, the net buoyant force slowly decreases again to reduce the sudden impact when the BPA stops at the top of its stroke. This will result in the water pressure in the rising main reducing, reducing also the potential backflow waterhammer effects in this rising main. At this point the main air supply valve, 32, is closed, the bladder exhaust valve, 31, is open and the bladder air supply valve, 33, is closed.

Figure 2E:
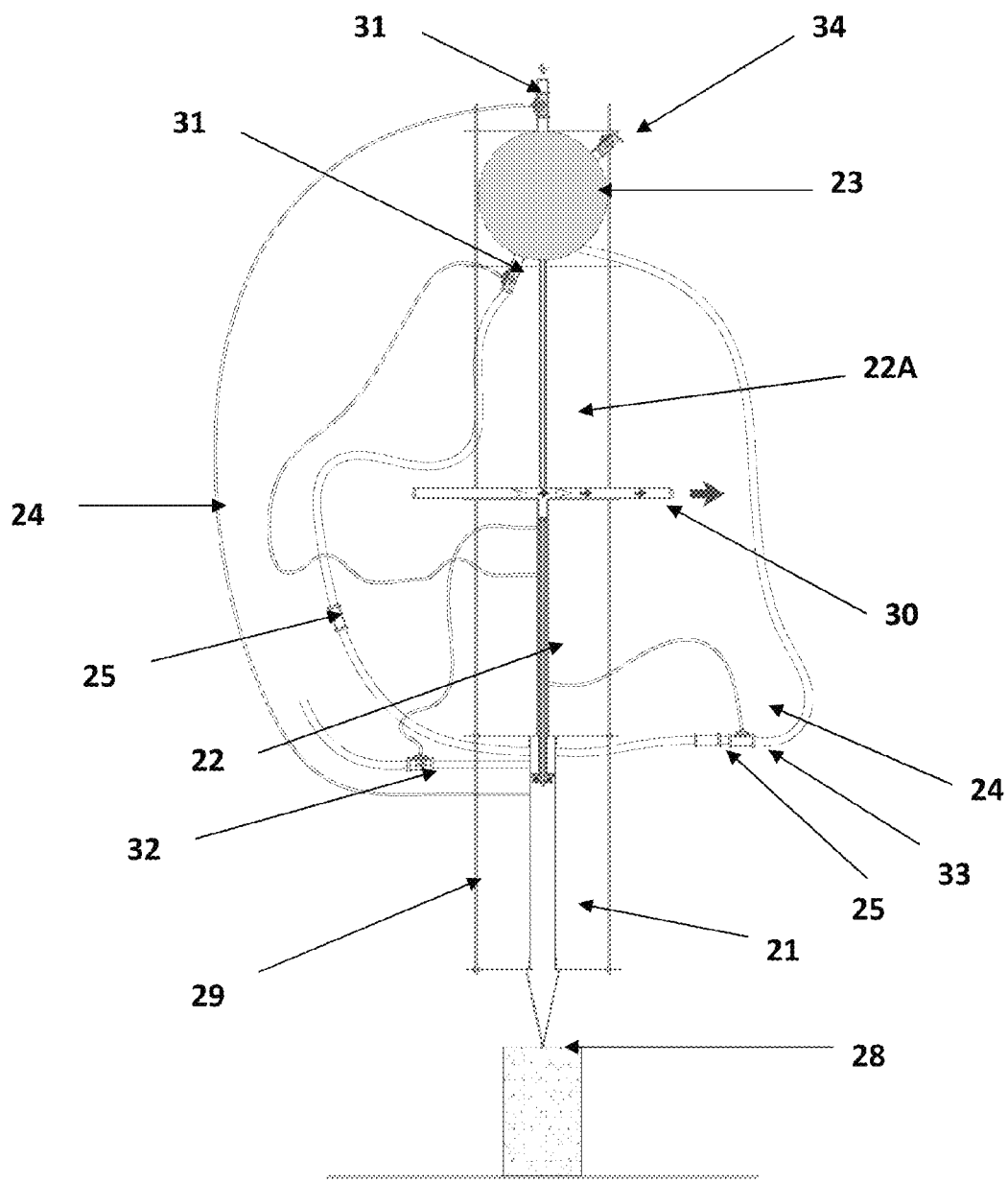

Referring to FIG. 2E of the drawings there is shown the stroke at the top dead centre. By this stage of the stroke, the BPA has risen to the top of its stroke. The SUP has just risen past the port triggering the valve on the main air supply line which opens up this valve and the LLC begins to pressurise.

At this stage, the LLP has risen past the port triggering the main bladder exhaust valve (BEV). This opens up this valve and the FB deflates at a faster rate.

Some deflation has already occurred through the return air/water purging valve, which was instigated as shown in FIG. 2D. As such, this small period of time at the top of the stroke is spent deflating the FB and pressurising the LLC. At this point the main air supply valve, 32, is open, the bladder exhaust valve, 31, is open and the bladder air supply valve, 33, is closed.

Figure 2F:
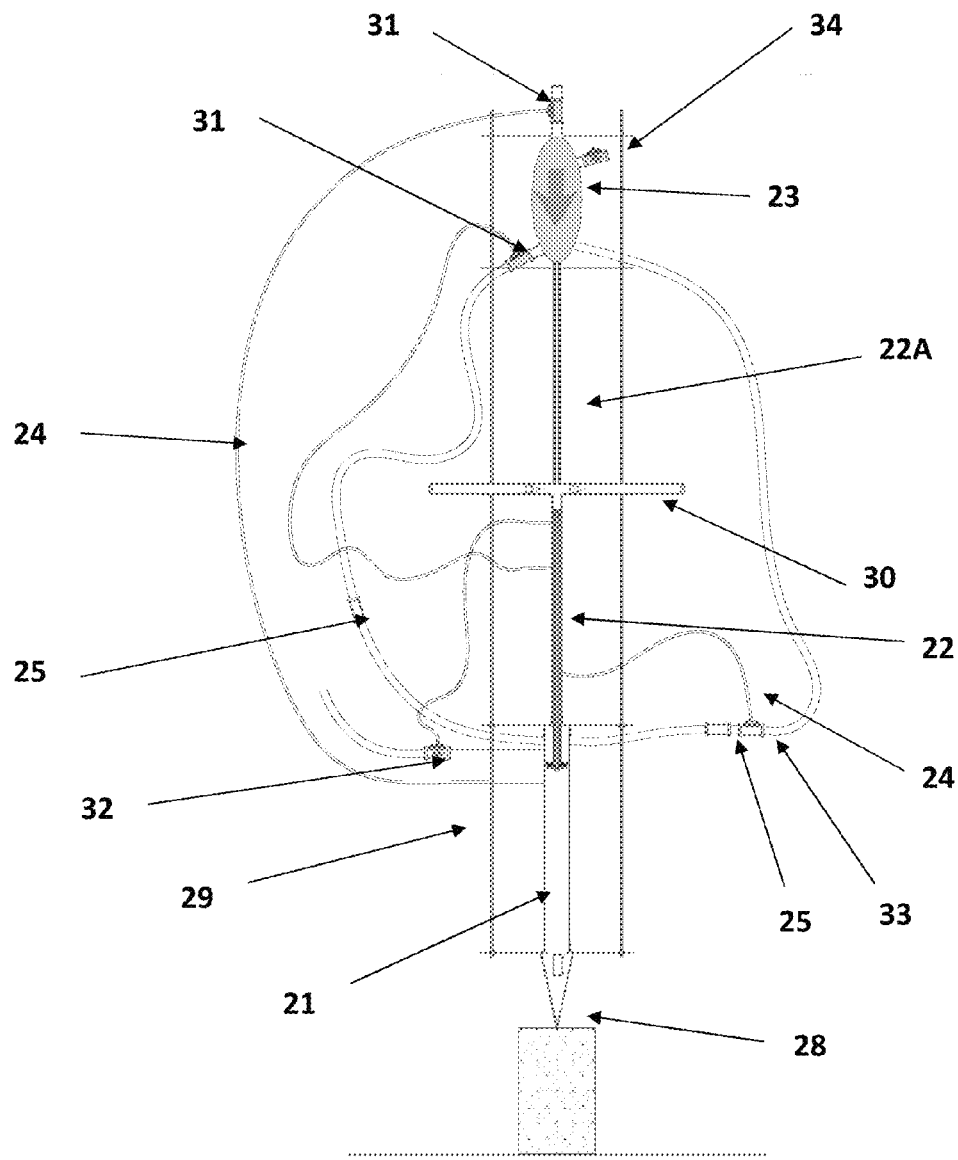

The stroke is shown at top dead centre in FIG. 2F as the cylinder piston is preparing to resume in a downwards direction. At this stage, the location of the BPA is the same as shown in FIG. 2E, however the BPA has now commenced its downward stroke. By this point in the stroke the FB is deflated (sufficiently) and the LLC is pressurised. At this point the main air supply valve, 32, is open, the bladder exhaust valve, 31, is closed and the bladder air supply valve, 33, is closed.

Figure 2G:
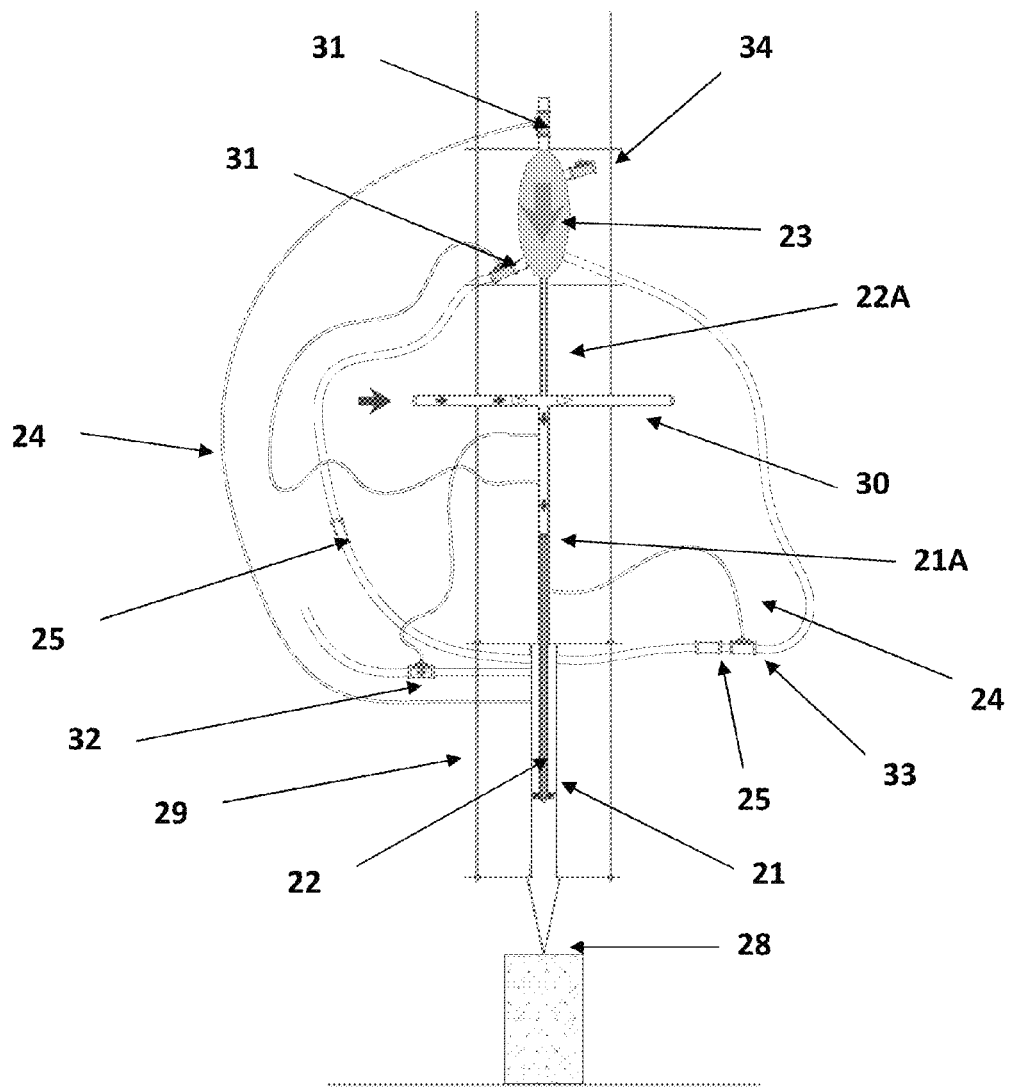

At the stage shown in FIG. 2G the BPA is well on its downward stroke. The main air supply valve is fully open and the FB supply valve is closed. The valve that regulates flow through the return air line from the FB is closed at this stage, as is the main exhaust valve from the FB.

The FB will continue to shrink in volume due to its flexibility, even though all inlet/outlet valves are closed, due to the increased confining pressure of the water as the FB is pulled deeper into the water. This reduces the buoyant force of the FB, increasing the rate of down-stroke and increasing the water inflow rate into the SUC. At this point the main air supply valve, 32, is open, the bladder exhaust valve, 31, is closed and the bladder air supply valve, 33, is closed.

Figure 2H:
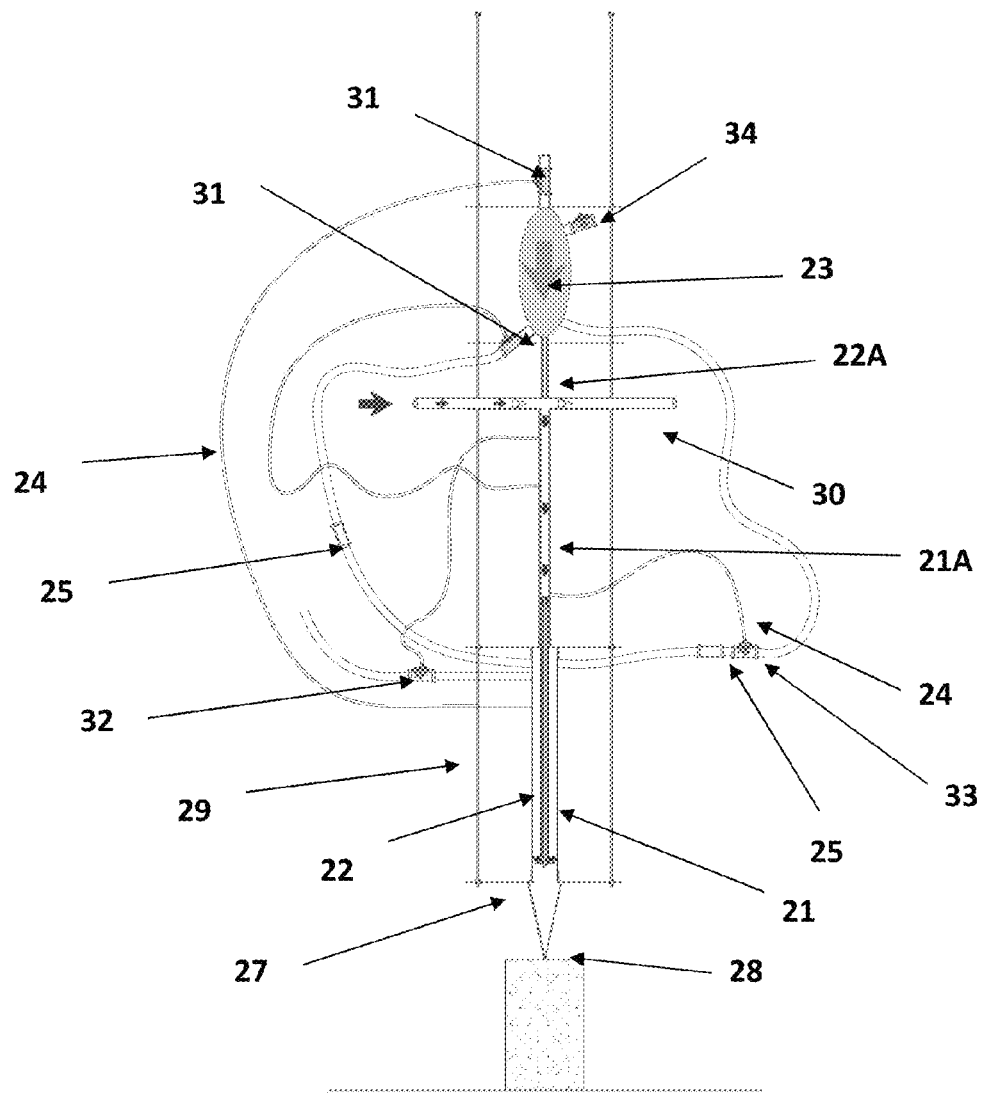

Finally in FIG. 2H, The BPA continues well on its downward stroke. Once it passes the port triggering the bladder inlet valve (BIV), the bladder begins to inflate. This occurs slightly before it reaches the bottom of its stroke, slowing the rate of down-stroke, and thereby reducing the sudden impact at the bottom. At this point the main air supply valve, 32, is open, the bladder exhaust valve, 31, is closed and the bladder air supply valve, 33, is open. After descending to the bottom, the cycle begins again as shown in FIG. 2A.

Stage Two, Three and More—Example b)

The second and third stages (and any subsequent stages) also include an emergency release valve, 34. This valve can be activated when the flexible bladder, 23, requires swift deflation in emergency or in preparation for down time.

The pump also includes a safety feature, such that in periods of high energy wave activity/storms etc, the air supply is checked and the whole system deflates to rest at its lowest submerged position in more stable conditions close to sea floor level.

The system then remains dormant until being recharged with air and the cycle automatically recommences.

The pumping system of the invention is not limited to 3 stages, but could involve several more stages to progressively increase pump pressures at any number of intervals to suit the particular application. Similarly, each stage of this total system could be utilised as a standalone stage within other existing systems. Also, if used in more protected waters of lesser wave/tide/current activity, this system can be utilised to both disperse and oxygenate by utilising:

The water pumping capacity to disperse (inc. longitudinally, laterally and vertically)

The air exhaust system to oxygenate the body of water, such that the potential effects of increased salinity, stratification, localised anoxia, etc are minimised.

Stage 2—Example b)

In a further embodiment as shown in FIGS. 3A to 3J there is shown a system including an intermediate stage S2A in which the primed gas from the first stage S1 from buoyant mechanisms on wave motion is converted into liquid pressure feed into Stage 2B.

Figure 3A:
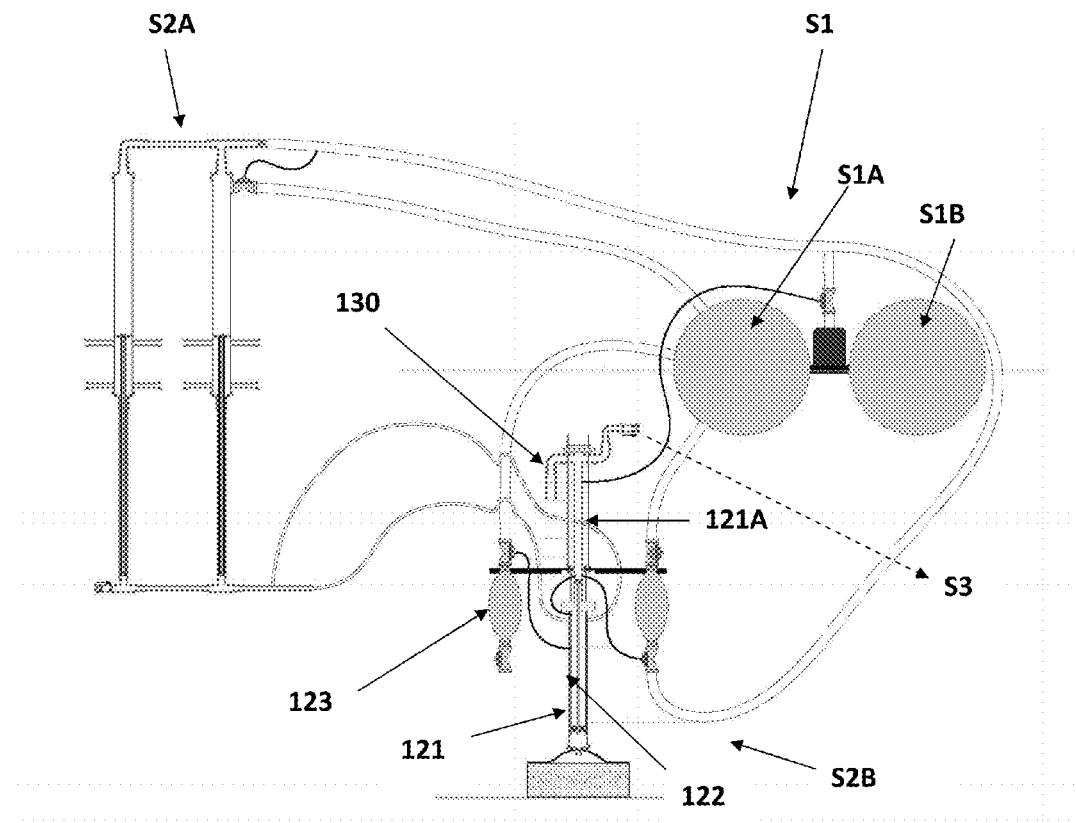
FIGS. 3A to 3J operational phases of a Stage 2 pump according to a second embodiment of the invention for use in a multi stage pump system such as in a method of desalination of FIG. 1, where an intermediate process is introduced to convert the low air pressure from stage 1 to low water pressure to drive stage 2 (in lieu of air pressure direct) and the operating pistons are aligned vertically where, sufficient depth of water is available.
Figure 3B:
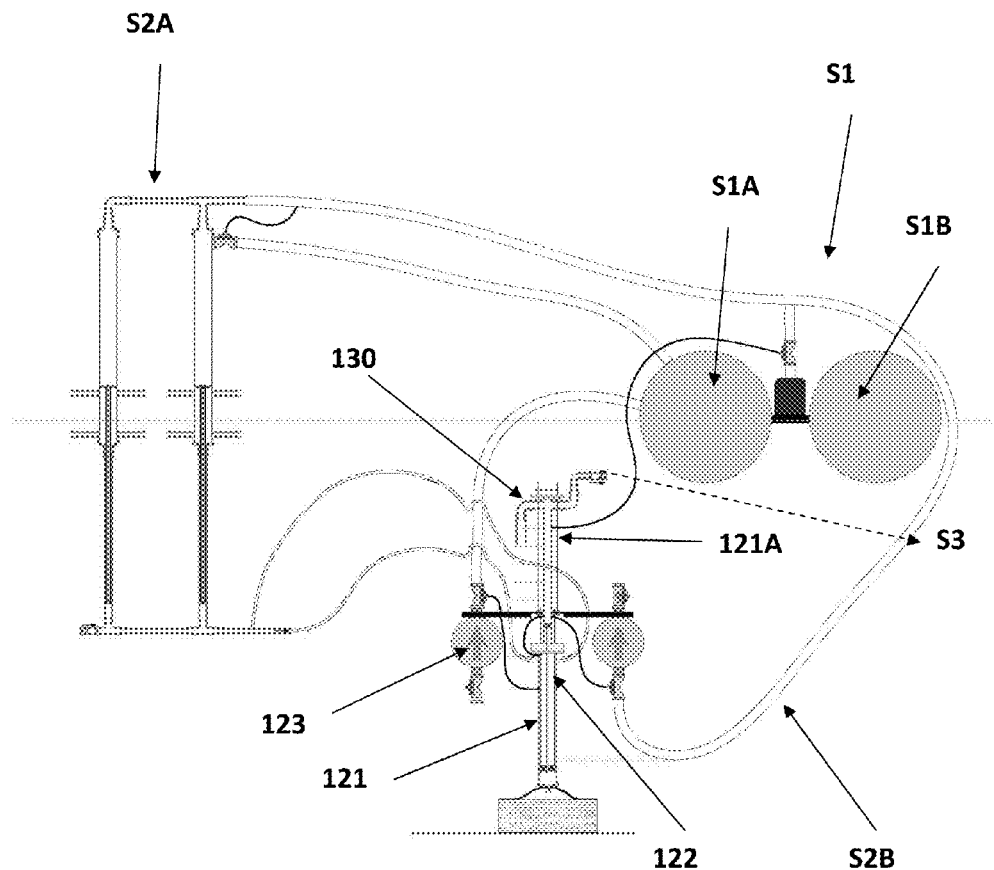
Figure 3C:
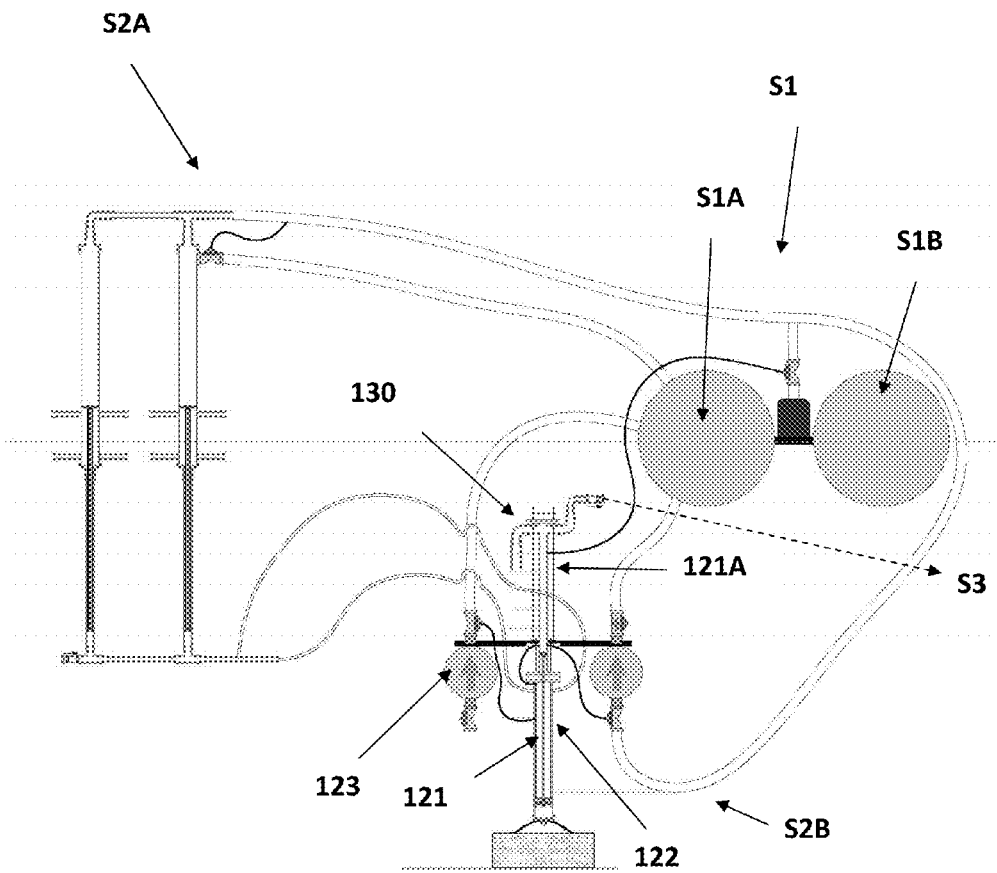
Figure 3D:
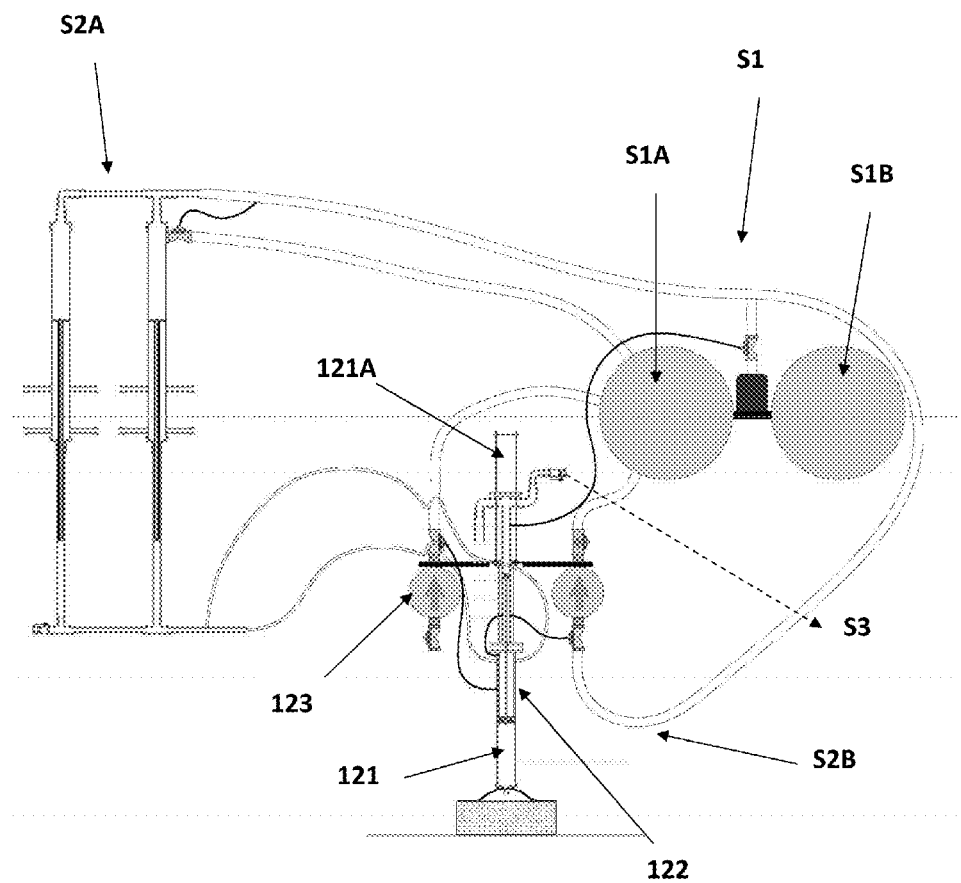
Figure 3E:
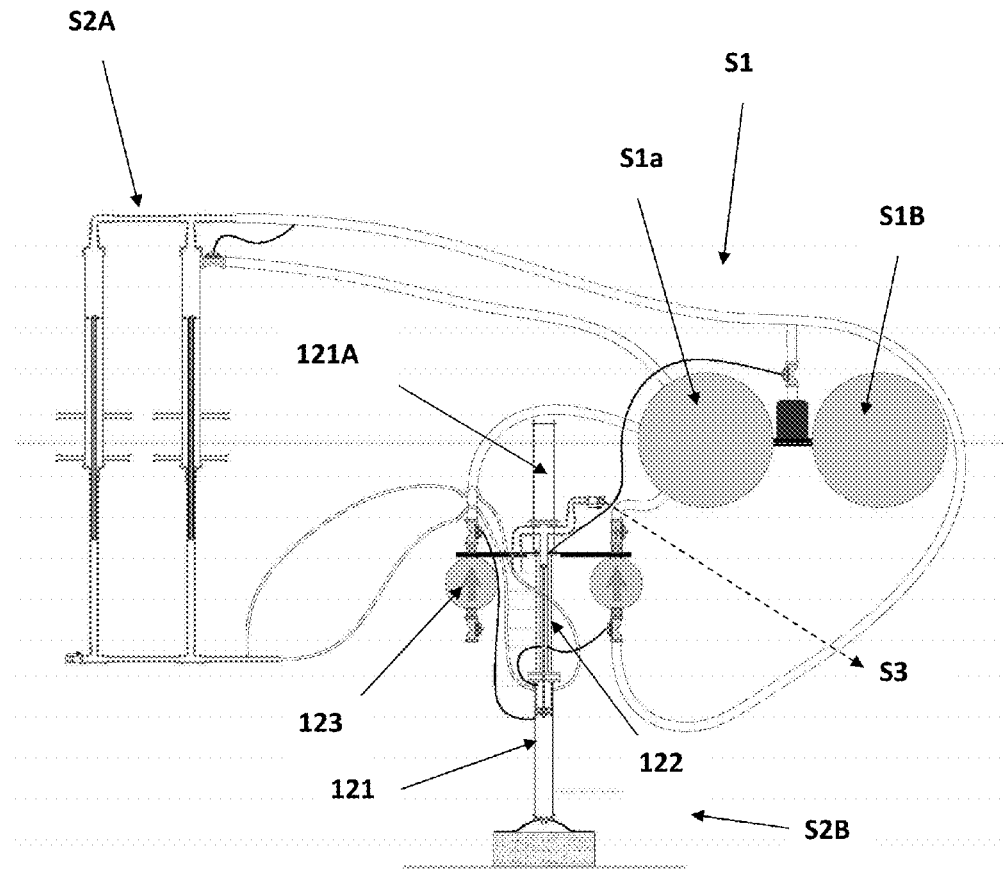
Figure 3F:
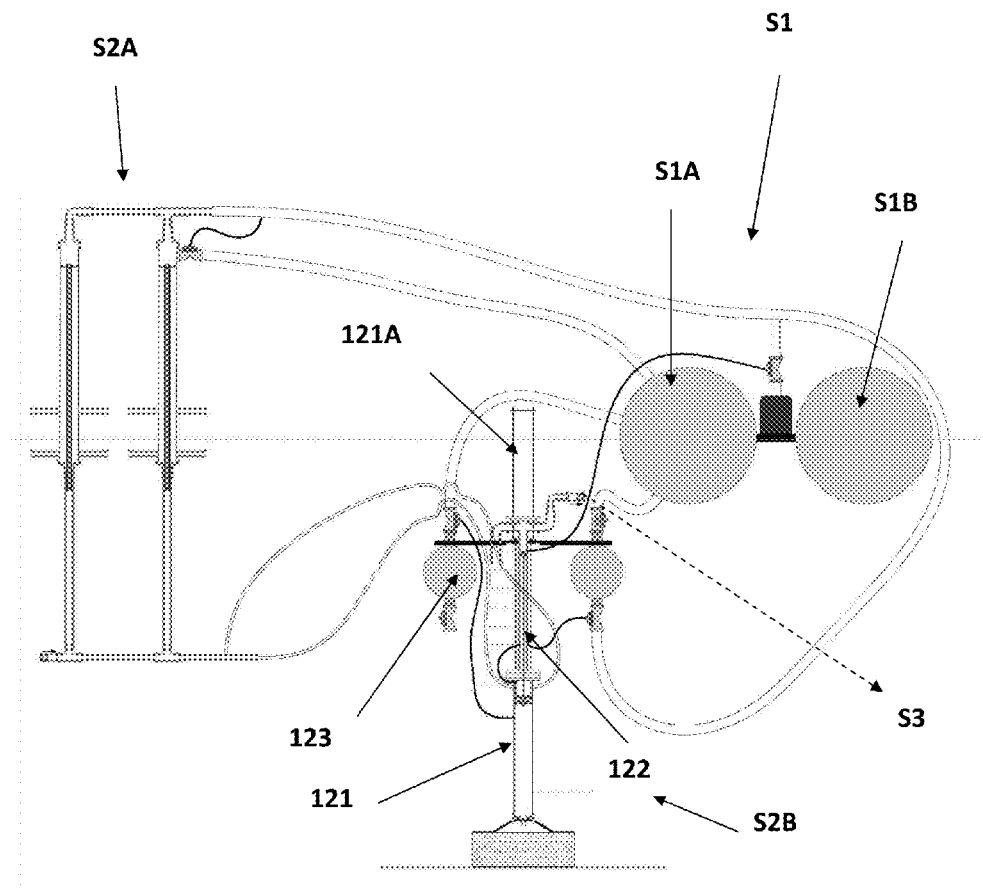
Figure 3G:
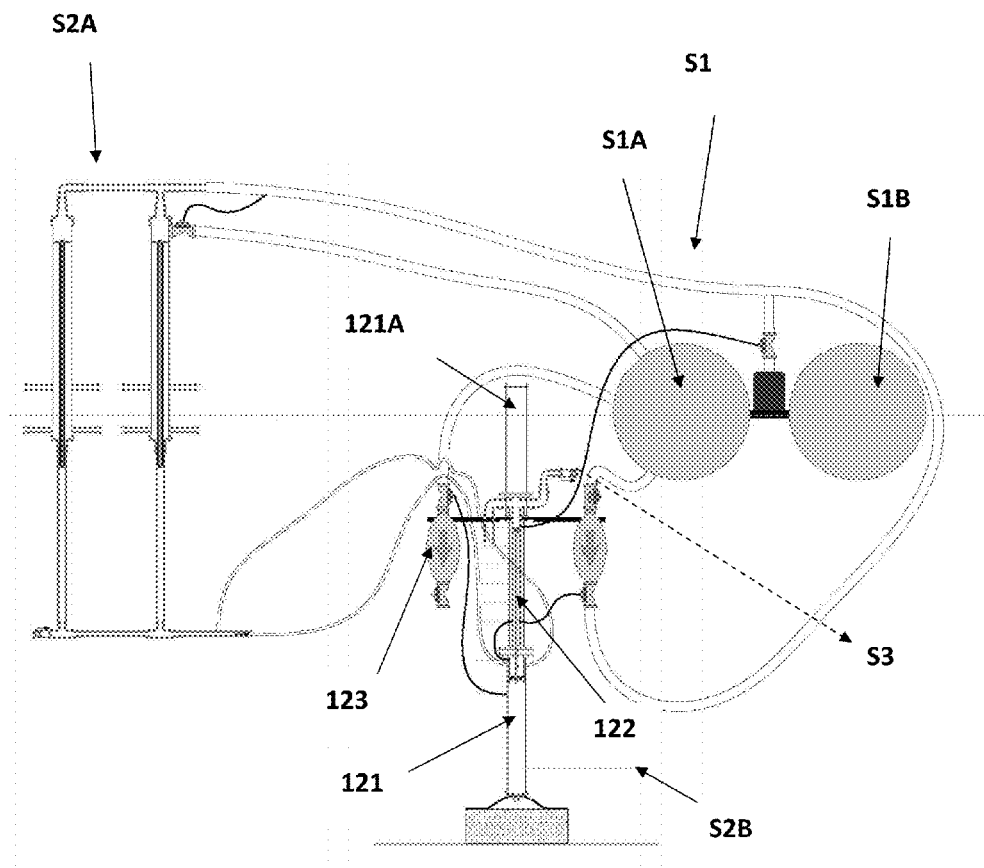
Figure 3H:
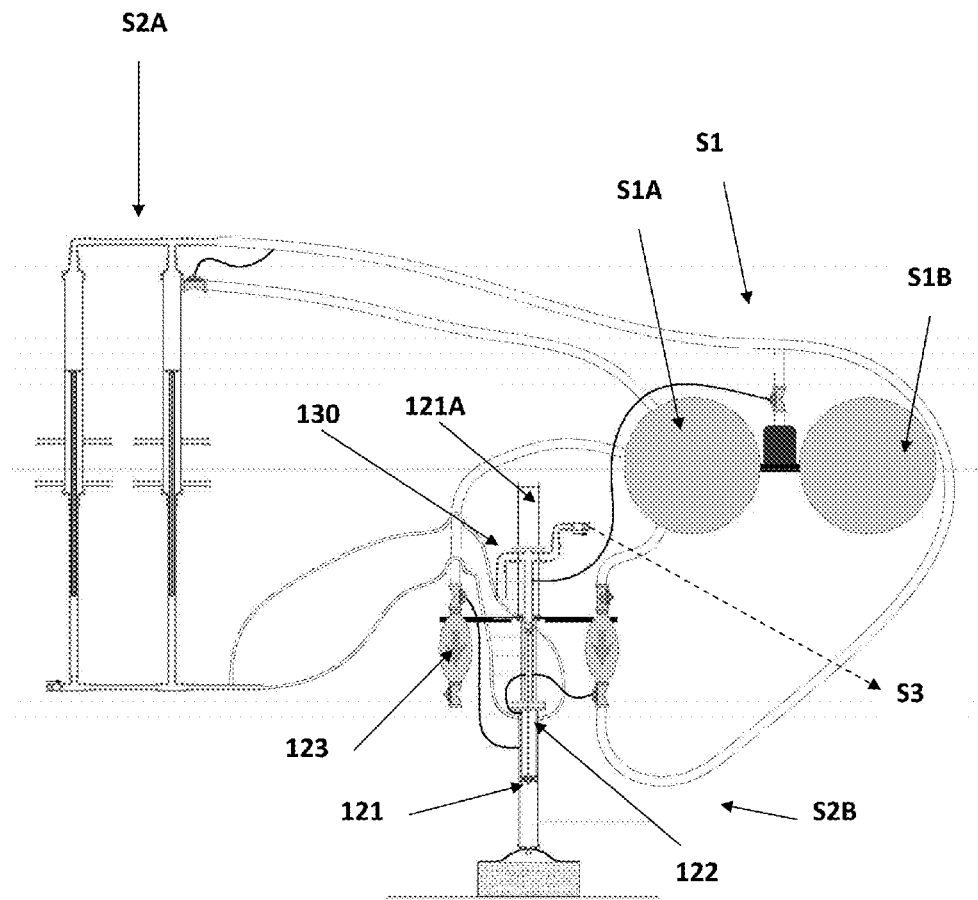
Figure 3I:
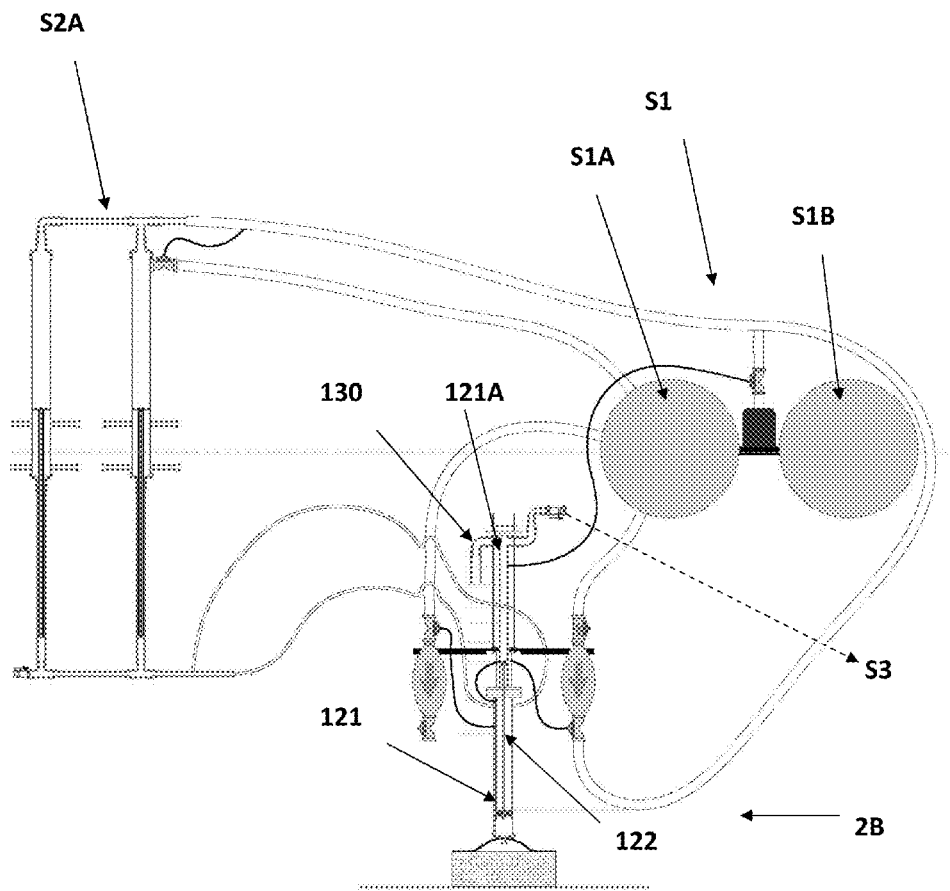
Figure 3J:
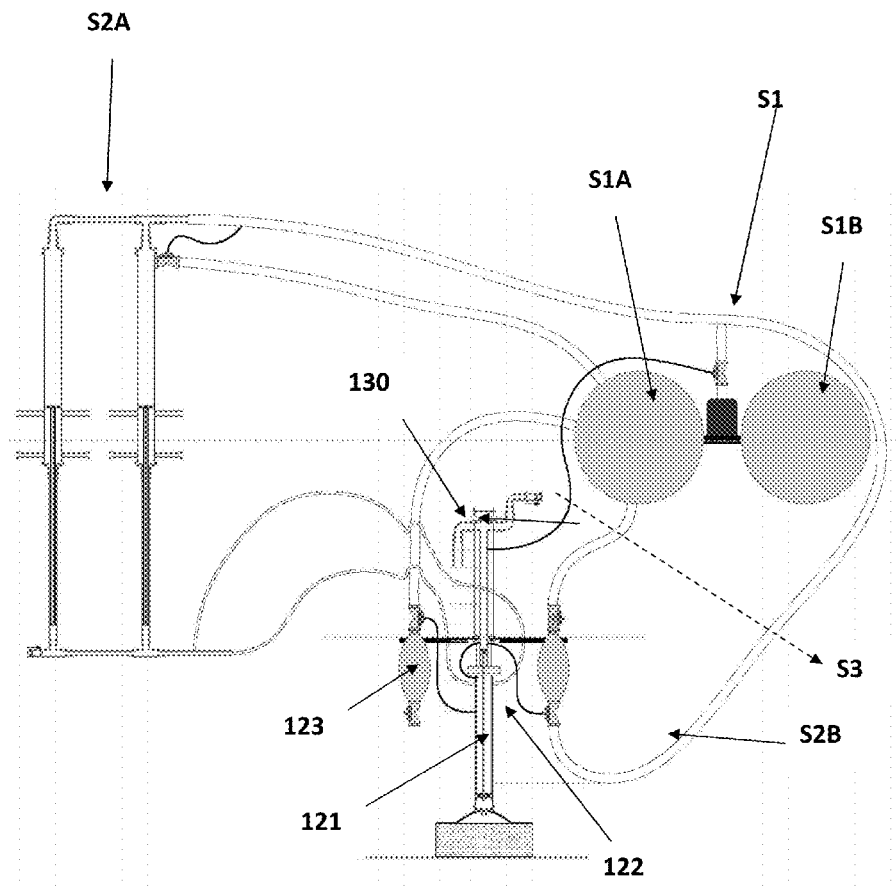

With respect to Stage two (S2B), the complete stroke of the cylinder is shown in FIGS. 9 through 18. The cycle commences at cycle step 1 as shown in FIG. 3A and proceeds to cycle step 10 as shown in FIG. 3J.

| Cycle step | bladder | Stroke Position/motion | Pressure Top/bottom cyl | fluid |
|---|---|---|---|---|
| 1 | deflated | Bottom/— | —/— | In 130 |
| 2 | inflating | Bottom/rising | HI/MED | Out from 130 |
| 3 | inflating | Bottom/rising | HI/MED | Out from 130 |
| 4 | inflating | Mid/rising | HI/MED | Out from 130 |
| 5 | inflating | ¾ up/rising | HI/MED | Out from 130 |
| 6 | inflated | Top/— | —/— | — |
| 7 | deflating | Top/falling | LO/HI | Into 130 |
| 8 | deflating | Mid/falling | LO/HI | Into 130 |
| 9 | deflating | 95% down/falling | LO/HI | Into 130 |
| 10 | deflated | Bottom/— | LO/HI | Into 130 |

Similar actions occur to the first embodiment and therefore all features are not identified.

It can be seen that the embodiment of FIGS. 3A to 3J show a multi-stage pump system for use in desalination systems including a first stage S1 providing low pressure for priming the system, a second stage S2 that is in fluid communication with the first stage and is primed by the low pressure from the first stage, and feeding to a third stage S3 (not shown). The second stage includes a first reciprocating member acting with Bladder and Piston Assembly 123, 121A, 122 (BPA) acting as a pump over the cycle of the stroke of the piston. 122;

The second stage includes a fluid conduit 130 similar to 30 of the first embodiment with an inlet point for drawing fluid from the fluid source or ocean when the piston 122 of the first reciprocating member undergoes a stroke, the fluid then passes through a passage and is expelled to an outlet to Stage 3 at higher pressure than entry. The downward angled entry of the fluid conduit 130 allows higher pressure water at deeper depths to enter when low pressure in cylinder 121A but minimises reflux.

The first stage S1 includes two floating buoyancy chambers S1A and S1B that are fed from flexible bladders (not shown) that are inflated due to wave action building pressure in the two floating buoyancy chambers S1A and S1B for priming the second stage.

The second stage S2B includes at least one reciprocating piston 122, in an enclosing cylinder 121, 121A and is attached to the two second flexible inflatable bladders 123. The piston 122 will move up and down the cylinder 121 121A relative to the movement of the two second stage flexible bladders 123 due to priming by the first stage affecting their buoyancy.

However the pressure feeds by fluid communication from the first stage to the second stage bladder though connection means. One connection means is gas feed from the two floating buoyancy chambers S1A and S1B directly to the second stage bladders 123. The pressure increase is transferred to Stage 2 by hydraulic pumping of gas which by an intermediate piston pump at S2A is converted to liquid pumping to allow driving into the cylinder 121 concurrently with inflation of the second stage bladder 123.

This stepped pressure increase is allowed by use of secondary energy of wave motion and buoyancy as well as mechanical pumping increases such that the first stage is substantially in the range of 4 psi to 40 psi. The pressure generated by the second stage, including utilisation of inflation and deflation of the second flexible bladder, can be substantially in the range of 40 psi to 200 psi. The pressure generated by the third stage, including utilisation of inflation and deflation of the third flexible bladder, can be substantially in the range of 500 psi to 800 psi.

While we have described herein a particular embodiment of a pump used in desalination systems, it is further envisaged that other embodiments of the invention could exhibit any number and combination of any one of the features previously described. However, it is to be understood that any variations and modifications can be made without departing from the spirit and scope thereof.

Stage 2—Example c)

Figure 9:
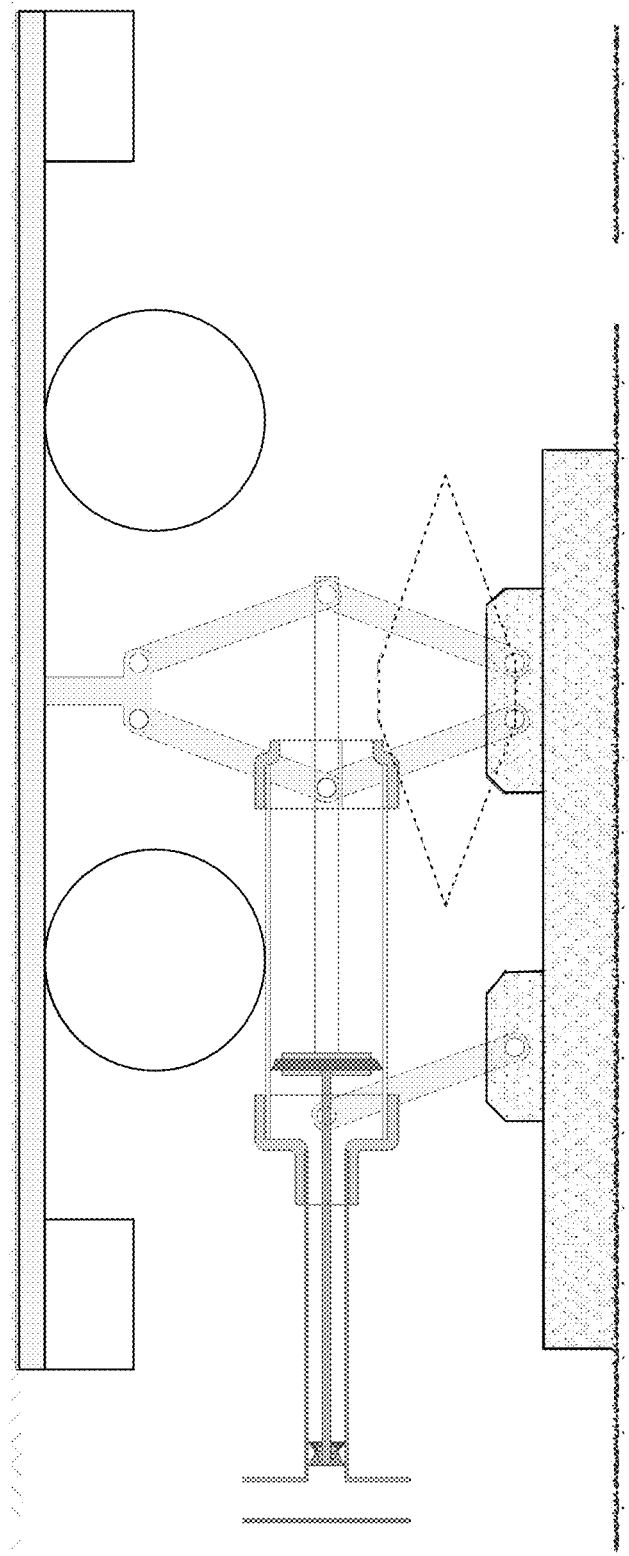
FIG. 9 is a diagrammatic view of one operational state of a Stage 2 pump according to a third embodiment of the invention for use in a multi stage pump system, such as in a method of deceleration of FIG. 8, and illustrates horizontally aligned operating pistons where desalination buffers at end of stroke are not required and water depth is limited.

In another form of Stage 2 pump as shown in FIG. 9 there is shown a Stage 2 pump that operates similarly to the pump of FIGS. 2A to 2G or 3A to 3J but instead of being vertically arranged is horizontally arranged so as to be usable in shallow water or to limit usage to particular stratification of a pond.

The second stage pump of FIG. 9 can be in fluid communication with the first stage and is primed by the low pressure from the first stage, the second stage including a first reciprocating member. The second stage has an inlet point for drawing fluid from a fluid source when the first reciprocating member undergoes a stroke, the fluid then passes through a passage and is expelled to an outlet at higher pressure when the first reciprocating member proceeds through a complete stroke.

Clearly this pump can also be used as a Stage 3 pump in a multi-stage pump system for use in desalination system.

Figure 9A:
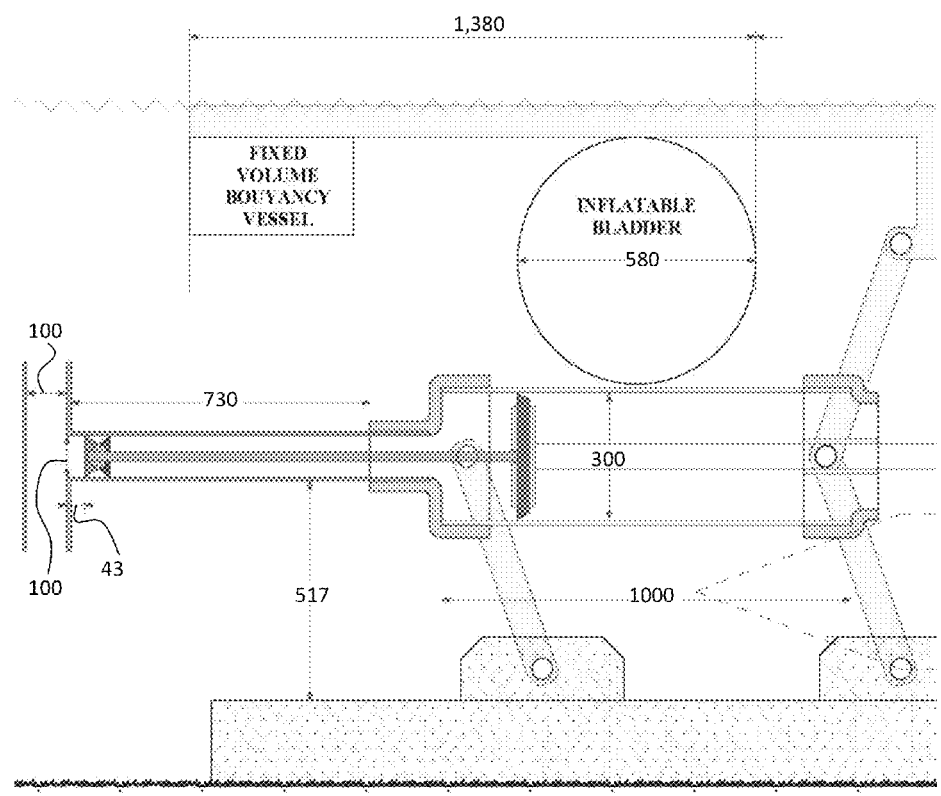
FIGS. 9a-9b are enlarged portions of FIG. 9 and may be concatenated to form FIG. 9.
Figure 9B:
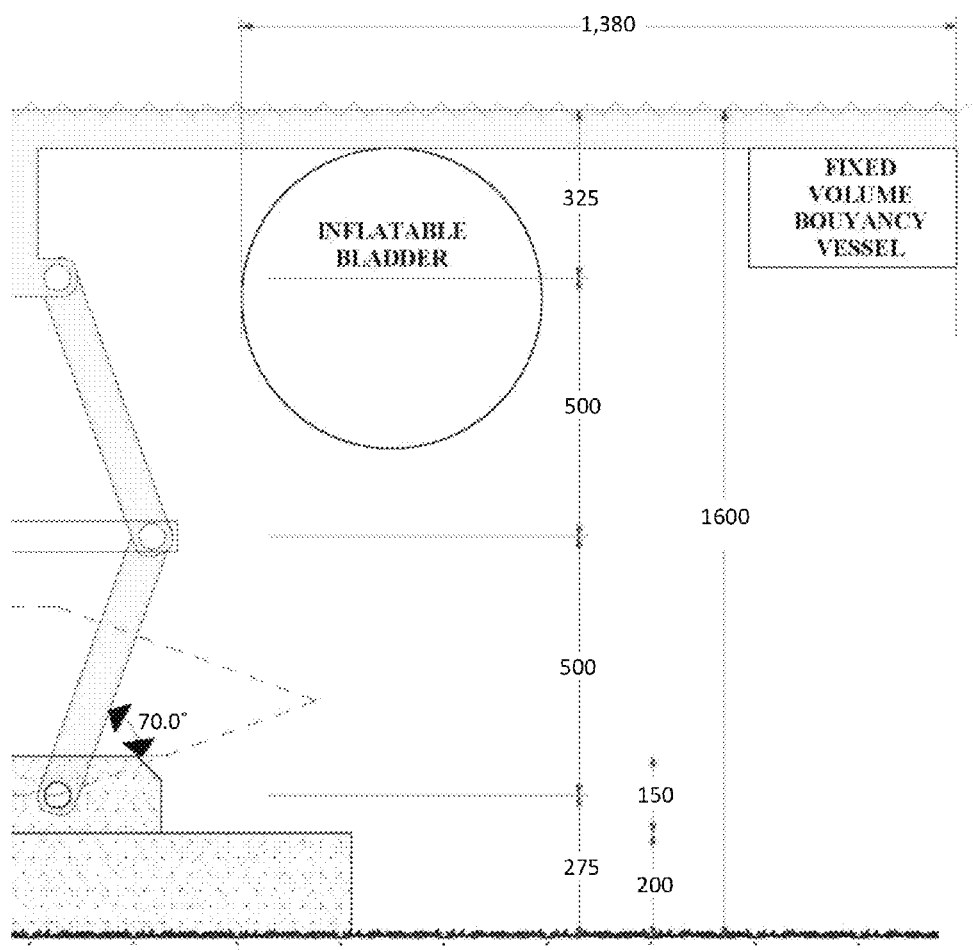

FIG. 9 has been divided into two sections FIG. 9a-FIG. 9b and enlarged to improve legibility. FIGS. 9a-9b may be concatenated to provide an enlarge version of FIG. 9.

System of Desalination—Example 1

With reference to FIGS. 4 to 9 there is shown a particular example of a method of desalination using a multi-stage pump system for use in desalination systems.

Figure 4:
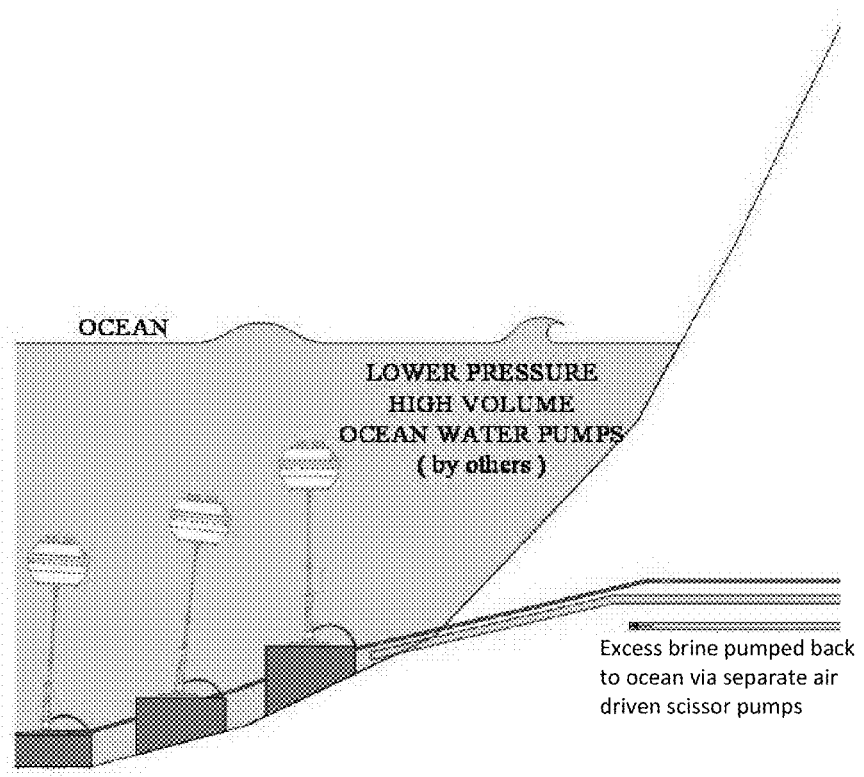
FIG. 4 is a diagrammatic view of an embodiment of a Stage 1 pump for use in a multi stage pump system such as in a method of desalination of FIG. 1.
Figure 5:
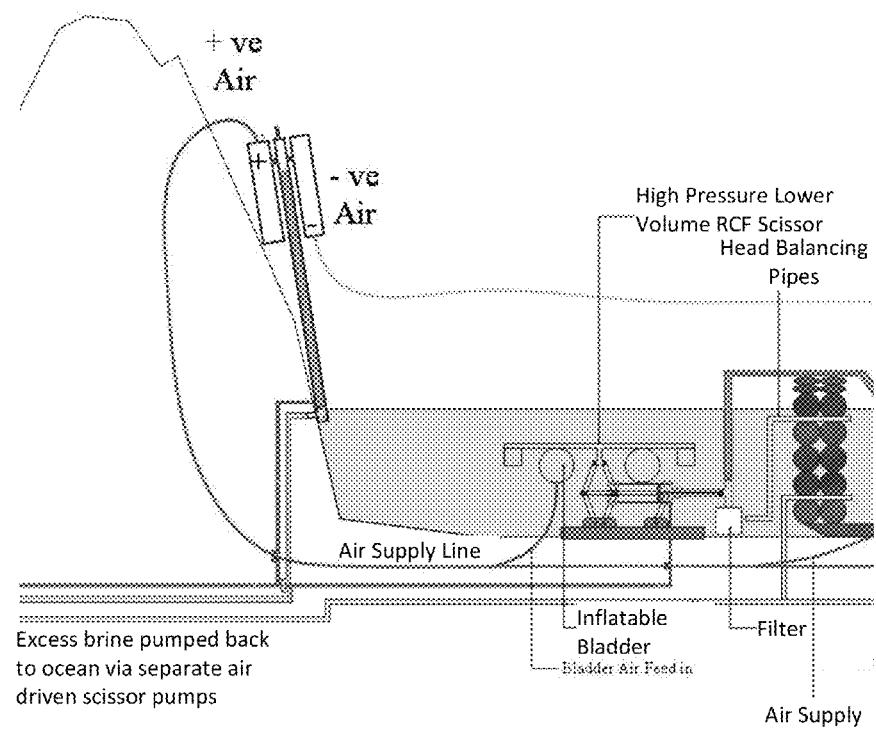
FIG. 5 is a diagrammatic view of an embodiment of a Stage 2 pump for use in a multi stage pump system such as in a method of desalination of FIG. 1.

FIG. 4 shows the first stage pump system. FIG. 5 shows a second stage pump system which is connected to the first stage pump system of FIG. 4.

Figure 6:
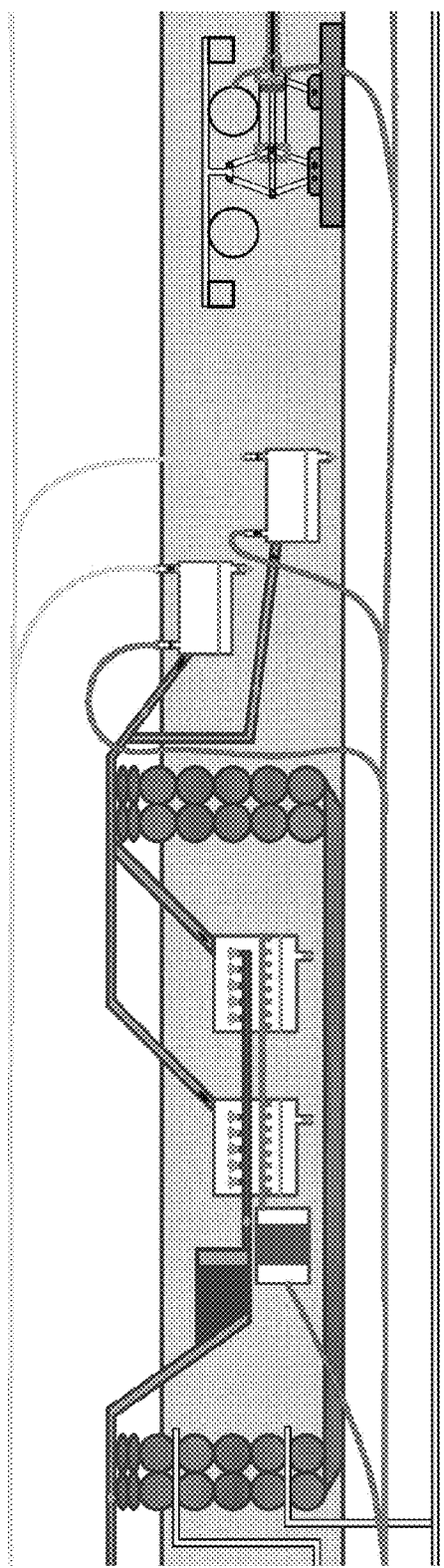
FIG. 6 is a diagrammatic view of a vacuum distillation process and an embodiment of interconnecting means for use in a multi stage pump system such as in a method of desalination of FIG. 1.
Figure 7:
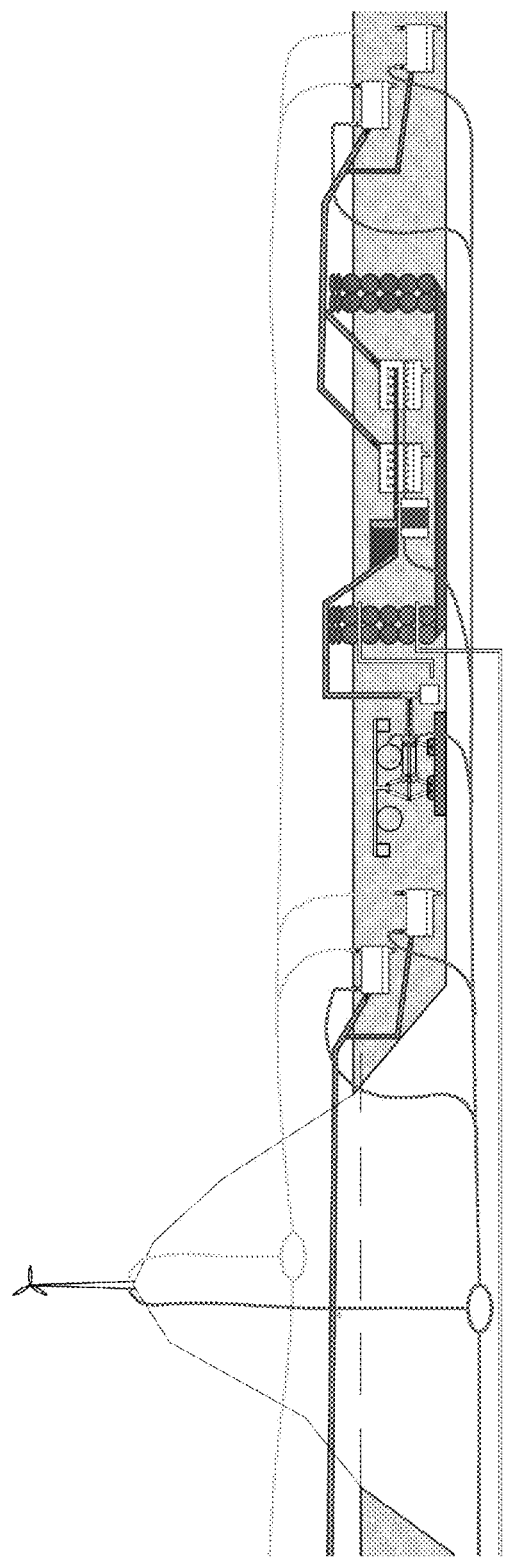
FIG. 7 is a diagrammatic view of an embodiment of a Stage 3 pump for use in a multi stage pump system such as in a method of desalination of FIG. 1.
Figure 7A:
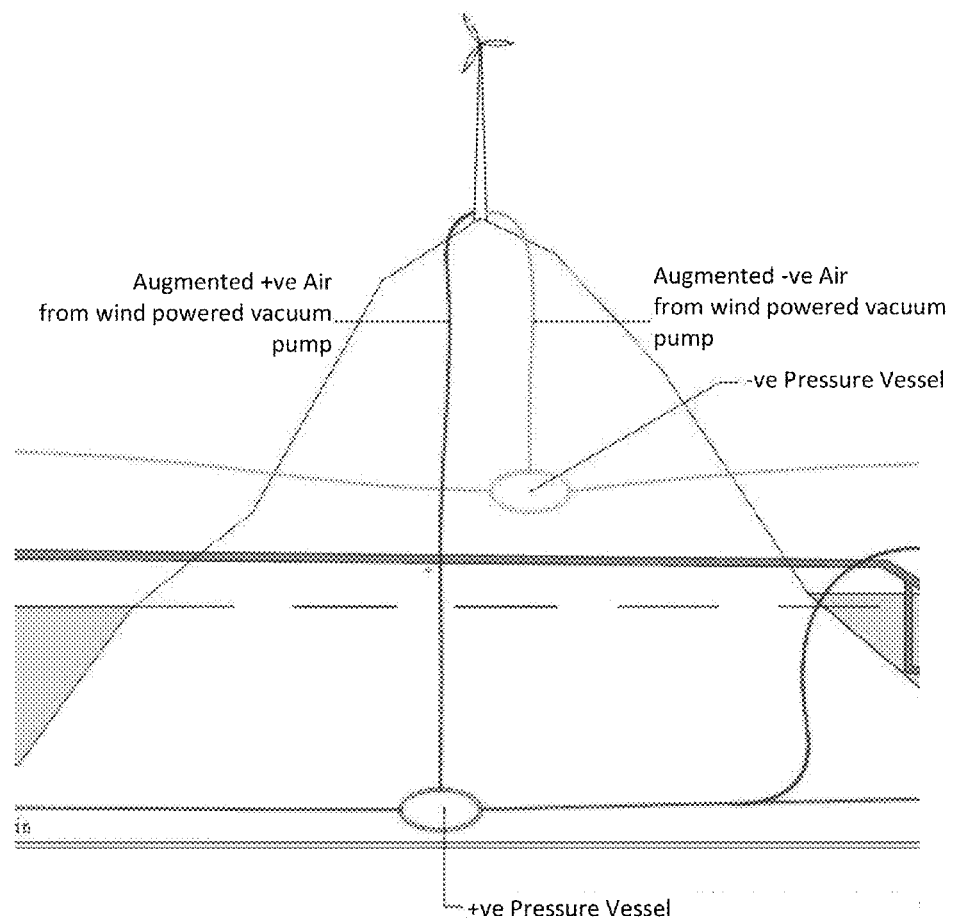
FIGS. 7a-7d are enlarged portions of FIG. 7 and may be concatenated to form FIG. 7.
Figure 7B:
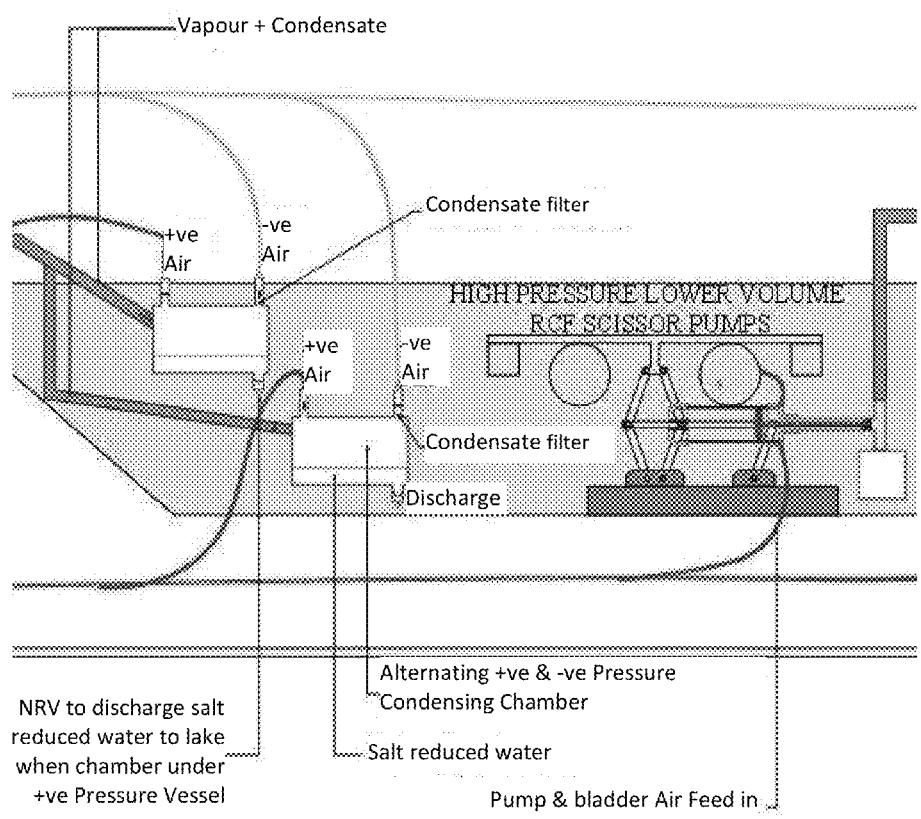
Figure 7C:
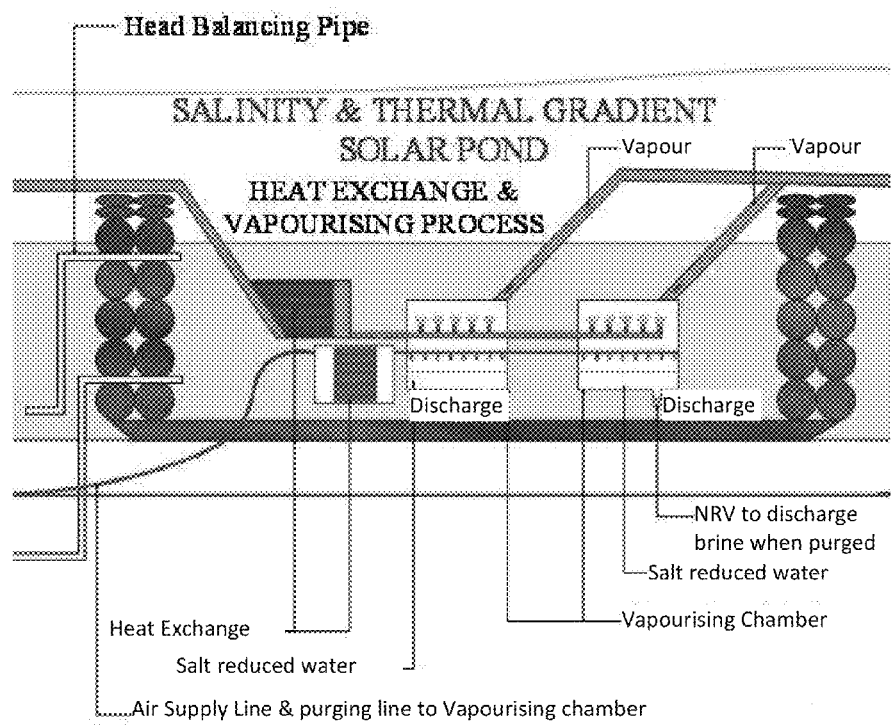
Figure 7D:
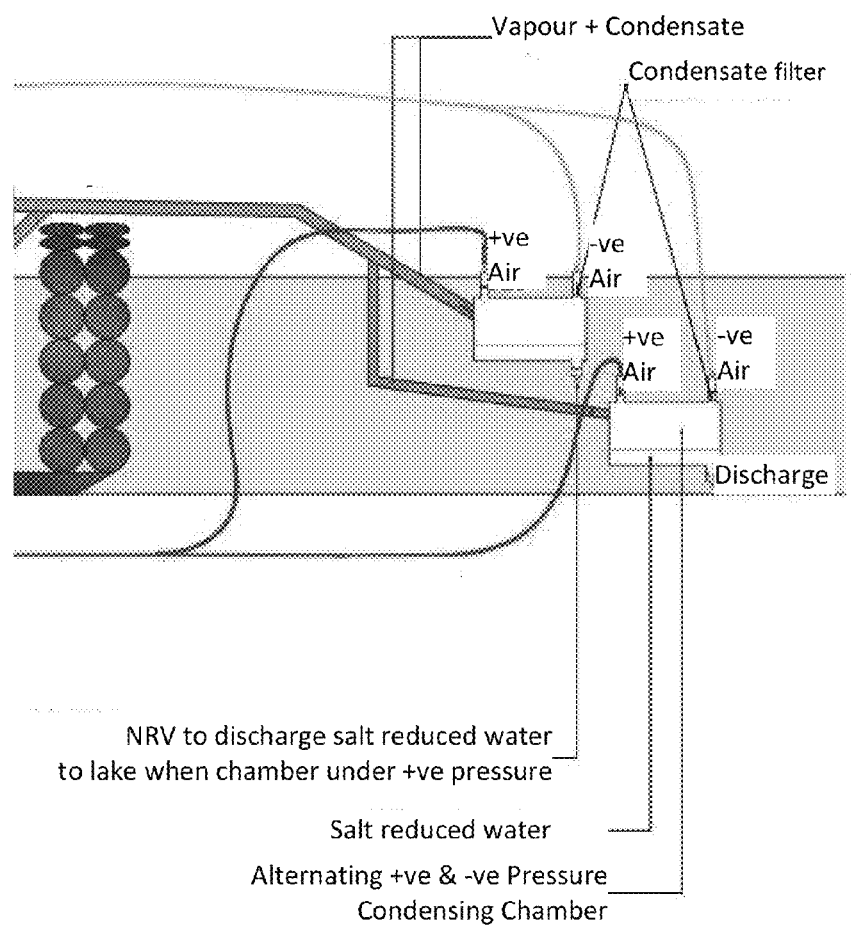

FIG. 6 shows a salinity and thermal gradient solar pond which is connected to the second state pump system shown in FIG. 5. FIG. 7 shows a second second-stage pump system which operates, in the illustrated example, adjacent the thermal gradient solar pond shown in FIG. 6.

Figure 6A:
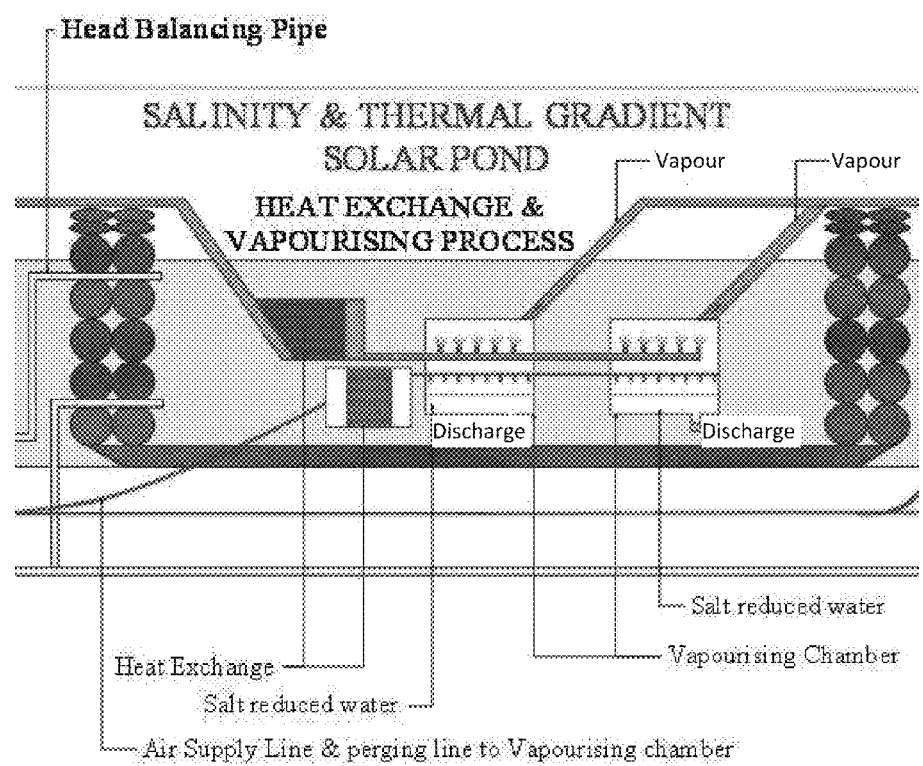
FIGS. 6a-6b are enlarged portions of FIG. 6 and may be concatenated to form FIG. 6.
Figure 6B:
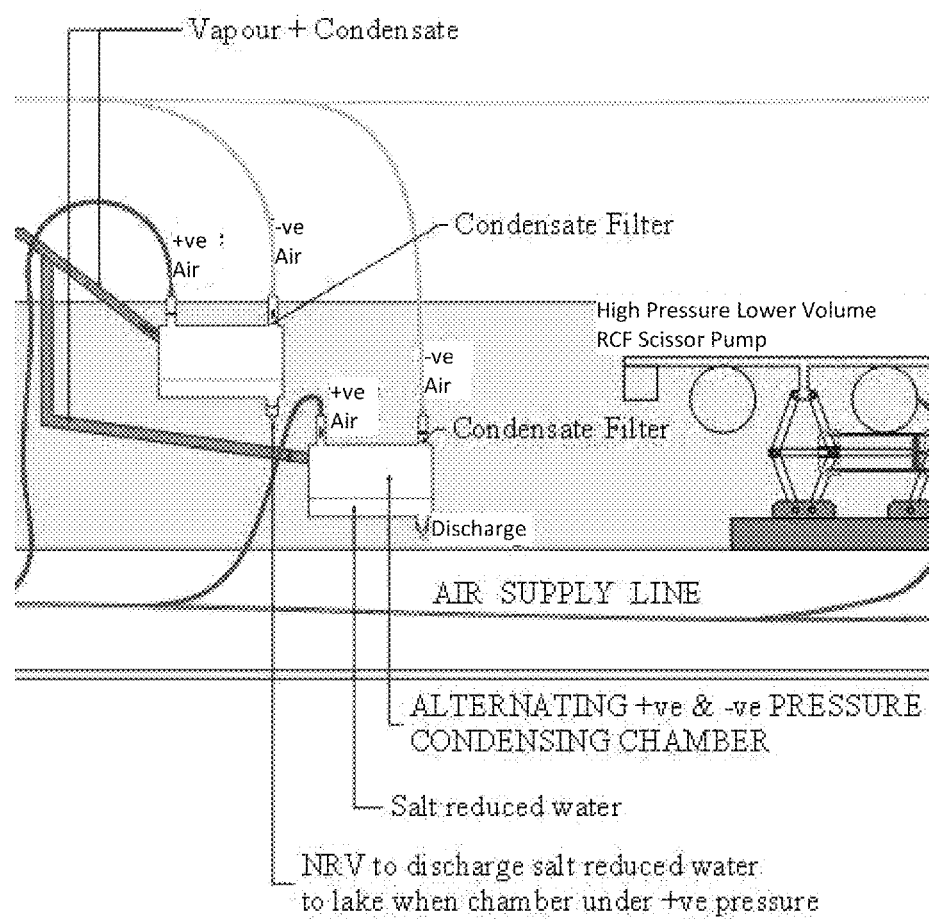

FIG. 6 has been divided from left to right into two sections FIG. 6a-FIG. 6b and enlarged to improve legibility. FIGS. 6a-6b may be concatenated to provide an enlarge version of FIG. 6.

FIG. 7 has been divided from left to right into four sections FIG. 6a-FIG. 6d and enlarged to improve legibility. FIGS. 6a-6d may be concatenated to provide an enlarge version of FIG. 7.

The first stage, shown in FIG. 4, provides low air pressure for priming the second-stage pump system shown in FIGS. 5 and 7. In the first stage water pump system use is made of a low pressure high volume ocean water pumps.

As shown in FIGS. 5, 6 and 7, the second and further stages are in fluid communication with the first stage and is primed by the low pressure from the first stage receives sea water for desalination. The second stage includes a first reciprocating member, and has an inlet point for drawing fluid from a fluid source when the first reciprocating member undergoes a stroke, the fluid then passes through a passage and is expelled to an outlet at higher pressure when the first reciprocating member proceeds through a complete stroke. This can be used in a third stage.

Referring in particular to FIG. 8, what is shown is a schematic representation of the desalination system, which has been divided essentially into two portions (e.g., upper/left figure, lower/right figure), both of which is shown in FIG. 8. The representation shown on the left of FIG. 8 shows the ocean on the left of the hill or sand dune with a first body of water or pond on the right of the sand dune. The representation showing on the right of FIG. 8 shows a portion of the first pond on the left of a second sand dune with a third pond on the right of the second sand dune.

Figure 8A:
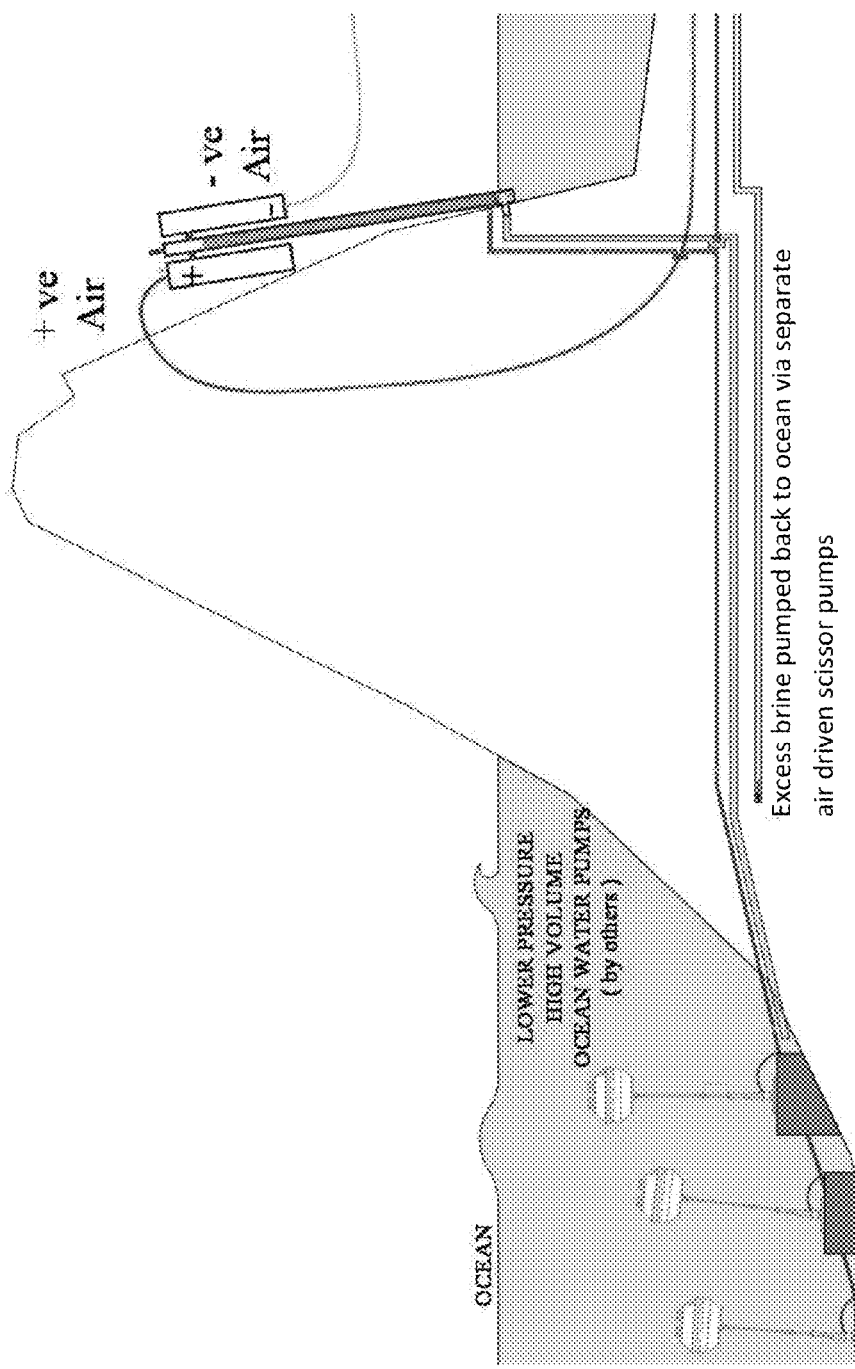
FIGS. 8a-8c are enlarged portions of the top-most diagram of FIG. 8 and may be concatenated to form the top-most diagram of FIG. 8.
Figure 8B:
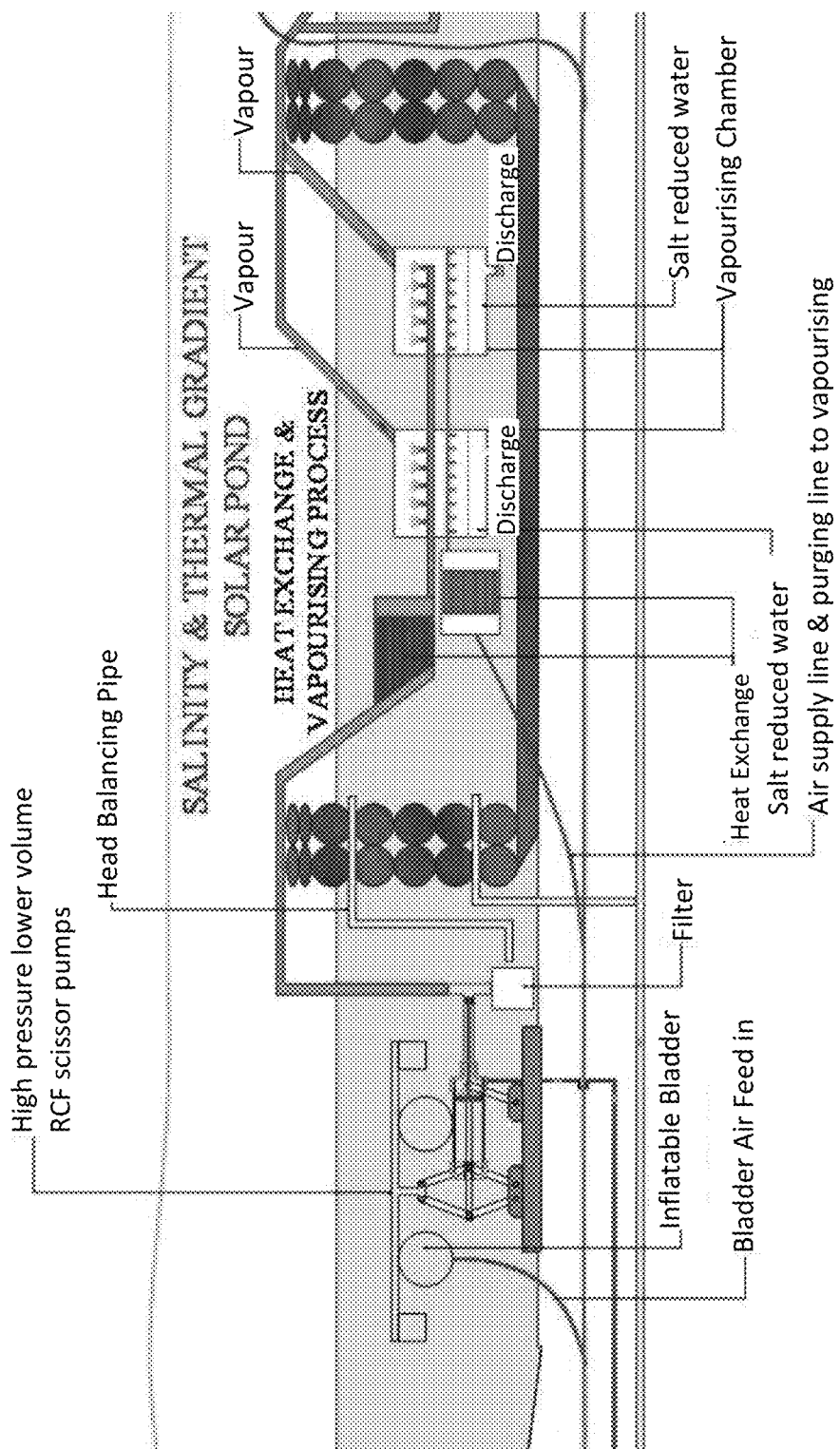
Figure 8C:
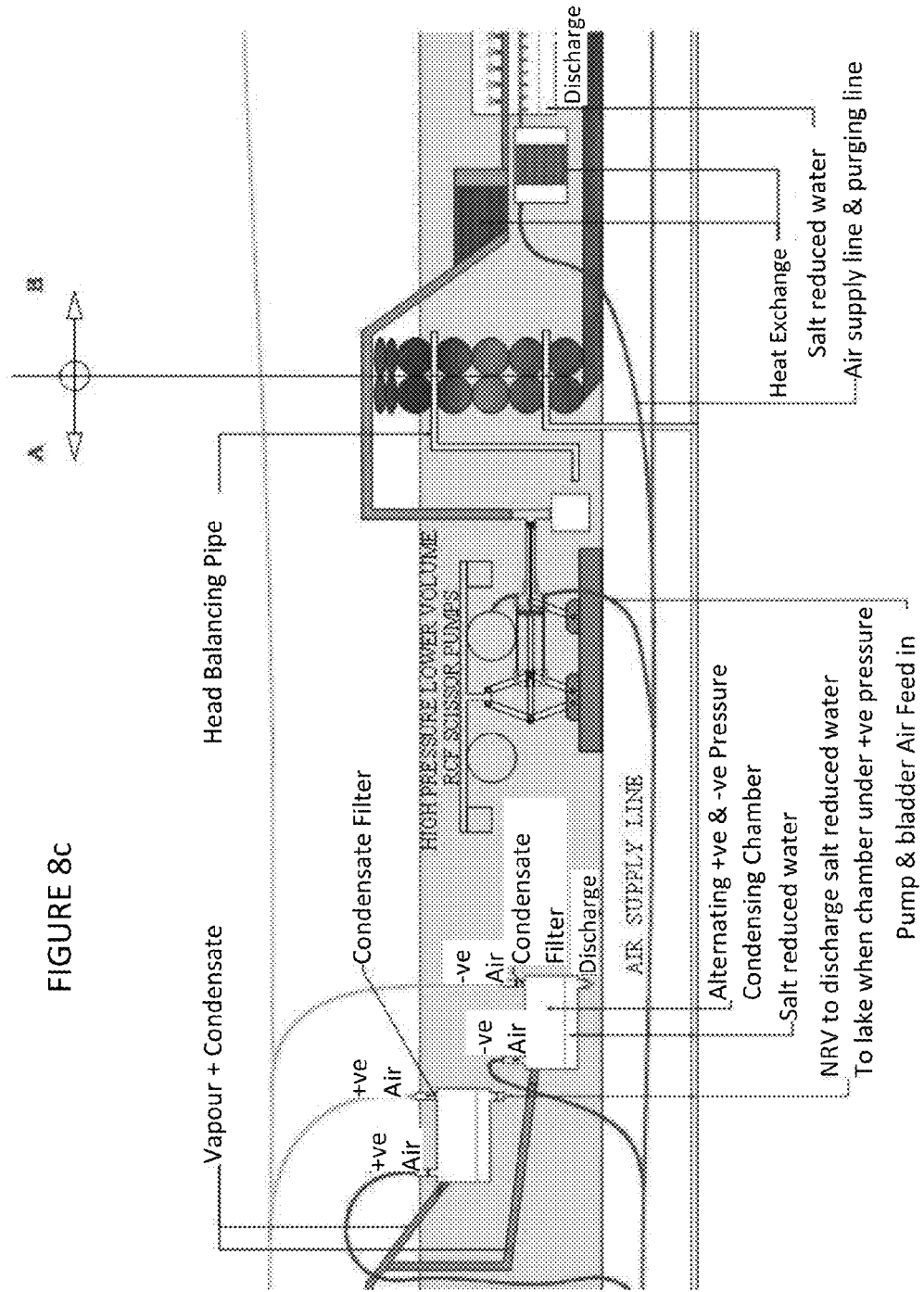

The upper/left figure of FIG. 8 may be concatenated with the lower/right figure of FIG. 8 to represent the desalination system. The upper/left figure of FIG. 8 has been further divided into three FIGS. 8a-8c to improve legibility. FIGS. 8a-8c may be concatenated to form an enlarged version of the upper/left figure of FIG. 8.

Figure 8D:
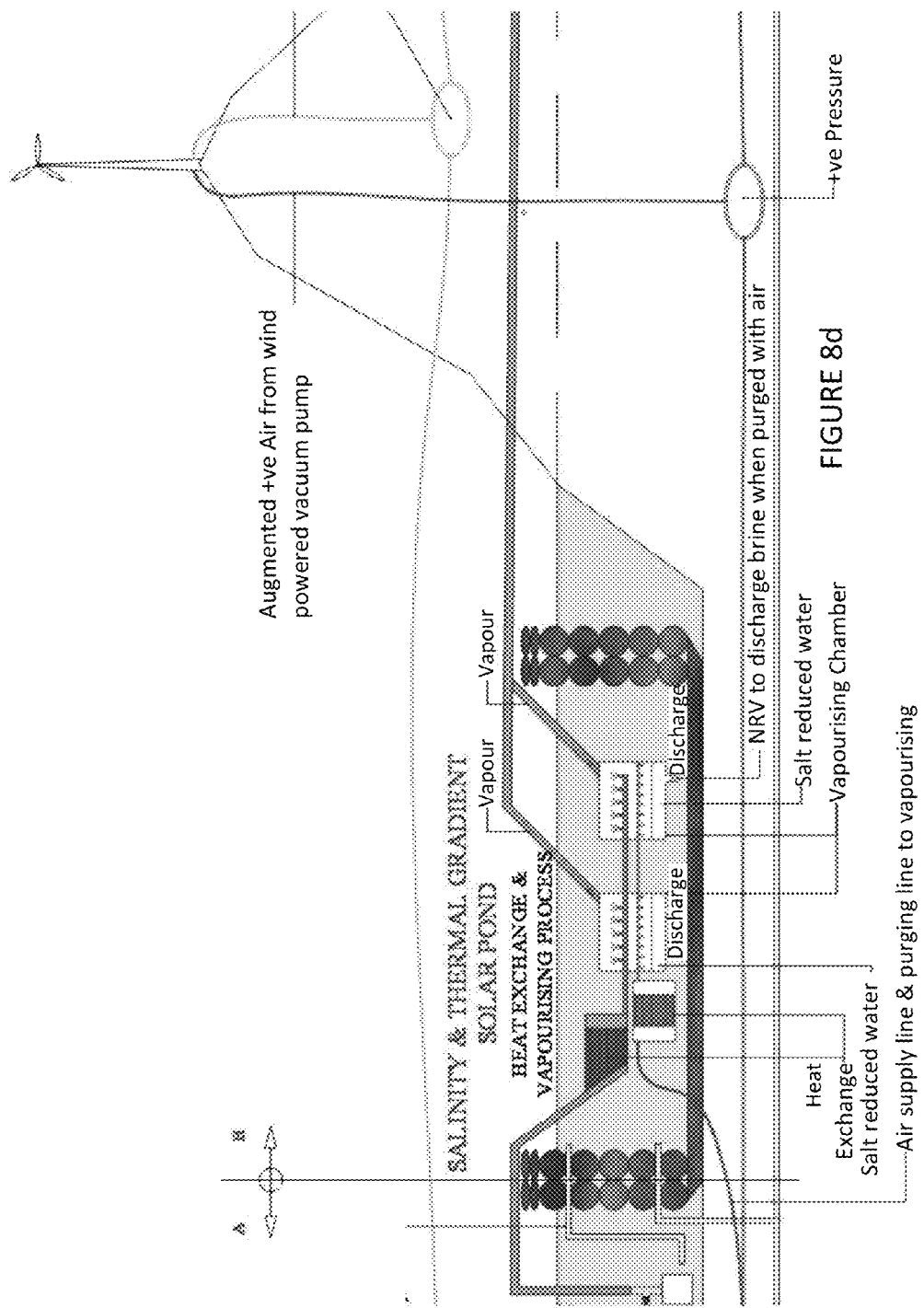
Figure 8F:
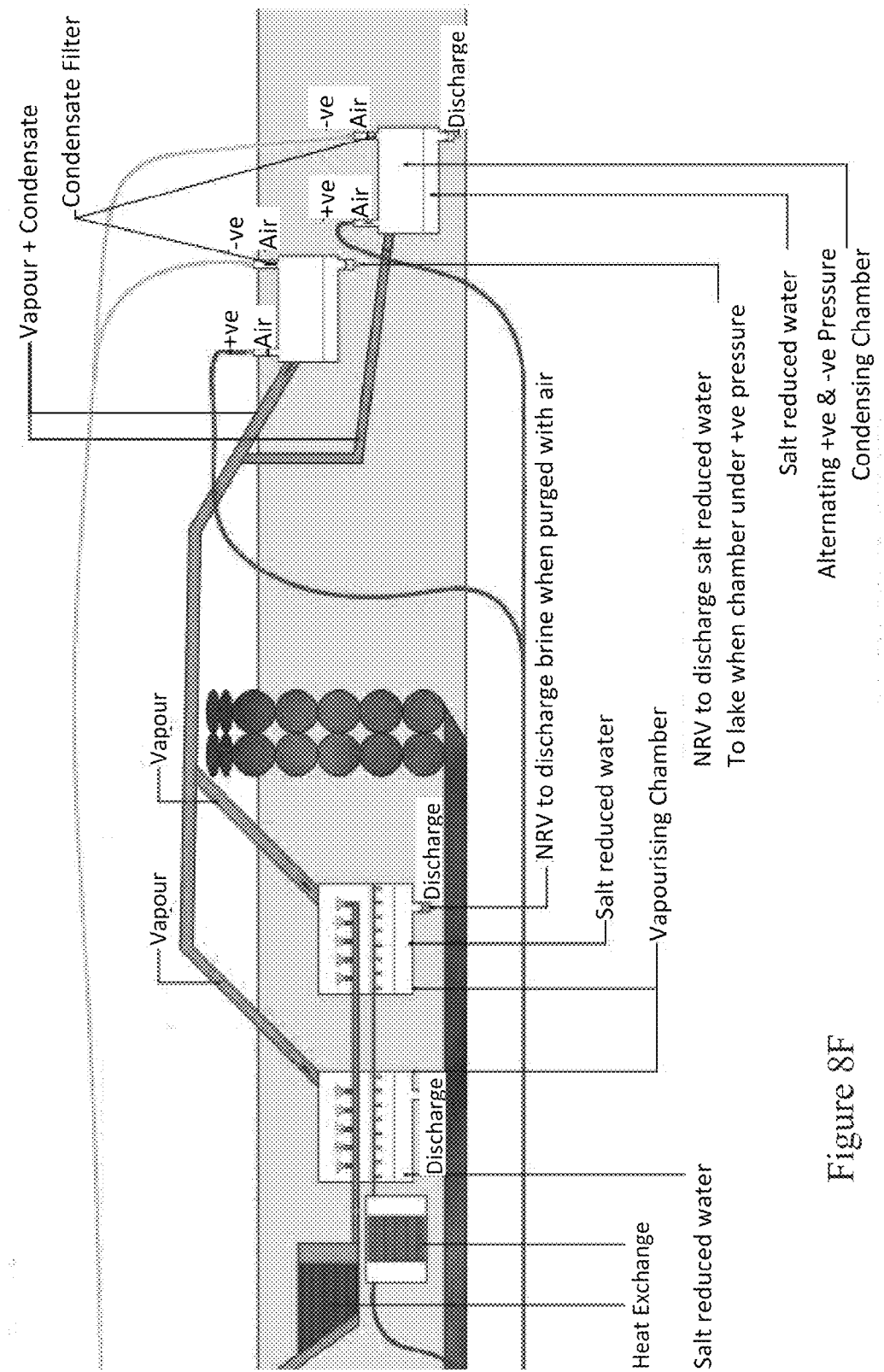

The lower/right figure of FIG. 8 has also been further divided into three FIGS. 8d-8f to improve legibility. FIGS. 8d-8f may be concatenated to form an enlarged version of the upper/left figure of FIG. 8.

Referring to the representation shown on the left of FIG. 8, the first stage water pump system, shown in FIG. 4, is installed in the ocean to the left of the first sand dune. In the illustrated embodiment, the first stage water pump system is mounted to the ocean floor thereby allowing air vessels to generate water pressure using movement of the air vessels in a swell of a wave as they wave moves past the first stage water pump system. Referring additionally to FIG. 4, the first stage water pumps system includes a number of ocean floor mounted buoyancy vessels, which are influenced by wave swells. The air vessels are tethered to pumps that are positioned adjacent to the ocean floor. Movement of the buoyancy vessels through swell motion causes the surface floor pumps to pump ocean water to a pipe column which is mounted, in the illustrated example, to the right of the first sand dune.

It should be noted that in the illustrated example submerged ocean water pumps are used in the first stage water pumps system especially in ocean areas where wave action of the particular ocean part is prone to be severe. Nonetheless, it is possible to use ocean surface operated water pumps in areas of the ocean which has more moderate wave action. In such areas of the ocean surface wave action can be used to generate air pressure directly through vertical movement of ocean surface through passing waves.

The first stage water pump system is used to drive the water up the pipe columns on the first sand dune. This upward movement causes air inside the pipe columns to be pressurised. This pressurised air is then used to operate the desalination system and to drive the multi-stage pump system.

The pipe column includes a number of valves which selectively open and close thereby allowing water, pumped upwardly by the first stage water pump system, to fall down the pipe column. This downward movement by the body of water inside the pipe column causes a negative air pressure to be generated which is also used in the desalination system.

The number of valves is operated with a control system, for example such as a programmable logic controller (PLC) system, or a water pressure valve system. A control system may include any electrical and/or electronic circuit. An electronic circuit may include any combination of active components, passive components, processing units, memory, storage, and/or communication circuit. A processing unit may include any circuit that executes stored instructions to perform a function.

Positioned inside the first pond is a variation of pumps of the second stage water pump system to that shown in FIGS. 2A to 2H and 3A to 3J. The variation of pumps is shown in greater detail in FIG. 9. The variation differs from the embodiments shown in FIGS. 2A to 2H and 3A to 3J through the mounting of the piston assembly so that the piston assembly is horizontally operated. Other than horizontally alignment of the piston assembly, the other elements are similar to the embodiments shown in FIGS. 2A to 2H and 3A to 3J where the piston assemblies are aligned vertically. With the piston assemblies aligned vertically, buffers at each end of the stroke are required to decelerate the piston. However, aligning the piston assemblies horizontally allow the assemblies to be incorporated into the geometry of the 'scissors' portion thereby allowing the associated forces to be equilibrated using polygons. Consequently these buffers may be omitted.

Although not shown in FIGS. 8 and 9, the bladder and piston assemblies include a valved tube arrangement of the type used to operate the bladder and piston assembly shown in FIG. 2A to 2H. It should be noted that the valved tube arrangement of the type shown in FIGS. 3A to 3J could equally be used.

Referring to FIGS. 8 and 9, the positive air pressure generated with the pipe column is used to inflate the bladders to affect vertical movement to the fixed volume buoyancy vessel. This vertical movement causes the piston to move inside the cylinder thereby to pressurise the water in piping connected to the piston cylinder assembly. Water is drawn through a filter into the piston cylinder assembly thereby allowing, through reciprocal vertical movement of the fixed volume buoyancy vessel, to draw water into the piston cylinder assembly from the first pond for pressurisation through reciprocal movement of the piston inside the cylinder.

To the right of the first pump of the second stage pump system is a first salinity and thermal gradient solar pond. The solar pond is designed to increase the water temperature of water contained inside the solar pond to temperatures as high as 60° or even higher. The solar pond is designed to achieve increase in water temperature by using the salt gradient of the water inside the solar pond. Essentially the water inside the solar pond will have a very high salt concentration which assists in raising the water temperature inside the water pond. The solar pond is constructed from a number of inflatable water rings similar to that used in PVC swimming pools. Essentially the solar pond heats up through the super saturation with salt of water inside the solar pond.

Pressurised water from the first pump of the second water stage pump system is pumped over a sidewall of the solar pond to a heat exchange component positioned inside the solar pond. The heat exchange component heats up the pressurised water using the elevated water temperature of the water inside the solar pond. Once heated, the pressurised water is then passed on to a vaporising chamber which allows the heated, pressurised water to evaporate thereby to effectively remove a substantial portion of the soluble and suspended components from the pressurised water. Vaporising jets are used to vaporise the heated, pressurised water inside the vaporising chamber.

Positive air pressure, produced by the pipe columns of the first sand dune, is also passed through the heat exchange thereby to heat the pressurised air before being passed into the vaporising chambers. This allows hot air to be injected into the vaporising chambers which improves efficiency of vaporisation of the heated, pressurised water.

The removed soluble and suspended components, which predominantly consist of salt, is then discharged from the vaporising chamber into the water contained in the solar pond. Depositing the salt content into the solar pond assists in maintaining or increasing the salt gradient of the solar pond water which, as stated hereinabove, is required to heat the solar pond water.

The water vapour is then channeled through piping from the vaporising chamber inside the solar pond to condensing chambers which are positioned inside cooler water of the first pond adjacent the solar pond. Although the heated water vapour will have a natural tendency to rise upwardly from the vaporising chamber, negative air pressure, generated through downward movement of water inside the pipe columns on the first sand dune, is applied to the condensing chambers thereby to draw the water vapour from the vaporising chamber.

The condensing chambers cool the water vapour as the condensing chambers are positioned inside the first pond water which will have a cooling effect on the water vapour. To further assist with condensing of the water vapour, positive pressure, generated by upward movement of water inside the pipe columns on the first sand dune, is applied during predetermined intervals to the condensing chambers thereby to assist in condensation of the water vapour. The increase in air pressure inside the condensate will pressurise the water vapour thereby forcing condensation. Alternating pressures is therefore used to either draw water vapour into the condensing chambers (using negative air pressure) or to promote condensation of the water vapour inside the condensing chambers using positive pressure. Condensated water is then discharged from a lower end of the condensing chambers into the first pond.

Thus, operation of the first pump of the second stage water pump system causes first pond water to be pumped under pressure through the solar pond from which heated water vapour is pulled using negative air pressure into condensing chambers positioned inside the first pond water to assist in cooling the water vapour. This processing of the first pond water reduces the salt concentration of the first pond water as vaporising of first pond water results in the lowering of the salt concentration thereof.

It should be noted that pressurised water from the first stage water pump system can be used to fill the piston cylinder assembly of the first pump of the second stage water pump system. However, this configuration will result in effectively seawater being treated in the first solar pond. This option may be selectively used to assist in elevating the salt concentration of water inside the first solar pond.

It should be noted that a number of condensing chambers are used to process the water vapour produced by the solar ponds. This allows pressurisation of a selected condensing chamber to be changed from a negative air pressure to a positive air pressure without disrupting the movement of water vapour from the vaporising chambers.

When the salt concentration of the solar pond becomes too high, brine water can be drawn from the solar pond for discharge into the ocean.

In a similar fashion, water of the first pond is pumped using a second pump of the second stage water pump system through a second solar pond for condensation in a number of condensing chambers positioned in the second pond. This allows water to be progressively desalinated from the ocean to the first pond, and from the first pond to the second pond.

Mounted to the second sand dune are wind turbines which are mechanically connected to compressor devices which are used to selectively either generate positive or negative air pressure. These positive or negative air pressures are used to supplement the air pressures generated by the pipe columns of the first sand dune.

It can be seen that the present invention could provide a multi-stage pump system which can be used in a desalination system for progressively reducing the salt content of water. Wave energy is used to provide low pressurised water which is selectively controlled to generate positive and negative air pressures using vertical pipe columns mounted to a structure such as a sand dune. This positive or negative air pressures is used in a controlled manner to drive a series of water pumps of a second stage water pump system thereby to pressurise water for use within a solar pond. Positive pressurised air is also passed through a heat exchanger positioned inside the solar pond so that the hot air can be injected into a vaporising chamber to improve vaporisation of heated, pressurised water. Negative air pressure is used to draw water vapour from the vapour chambers into condensing chambers which are cooled using ambient water temperature of a body of water which is positioned adjacent the solar pond. Additionally, positive air pressure is used to selectively pressurise the condensing chambers thereby to promote condensation of the water vapour. Pressurised water from the first stage water pump system can also be used to drive at least partly a first pump of the second stage water pump system thereby to assist in increasing pressurisation of water pumped through the first pump.

Although this system has been described with reference to use within the ocean, it would be possible to use this system in other types of water bodies. The only limitation that is required is that the stages following the initial stage require some form of pressurised air to be provided, generally from the initial stage. Depending on scale of operation required, possible alternatives for the initial stage are a windmill type air compression stage or a rechargeable cylinder of pressurised air or using an oscillating water column principle.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A multi-stage pump system for use in desalination systems, the multi-stage pump system comprising:
   a. a first stage providing a first fluid at a first pressure; and
   b. a second stage that is in fluid communication with the first stage and is primed by the first fluid from the first stage, the second stage including a first reciprocating member, an inlet for drawing a second fluid from a second fluid source when the first reciprocating member undergoes a stroke and an outlet for expelling the second fluid at a second pressure when the first reciprocating member proceeds through a complete stroke, the second pressure greater than the first pressure,
   wherein, the second stage further includes a flexible bladder submerged in the second fluid source and the first reciprocating member is movable in response to a change in buoyancy of the flexible bladder as it is at least partially inflated and deflated using the first fluid.

2. The multi-stage pump system according to claim 1 wherein the reciprocating member reciprocates in a substantially vertical direction with respect to gravity.

3. The multi-stage pump system according to claim 1 wherein the reciprocating member reciprocates in a substantially horizontal direction with respect to gravity.

4. The multi-stage pump system according to claim 1 wherein the first stage and the second stage are in fluid communication through connection means.

5. The multi-stage pump system according to claim 1 wherein the first reciprocating member includes a reciprocating piston in an enclosing cylinder, wherein the piston is attached to the flexible bladder of the second stage such that the piston will move up and down relative to the movement of the flexible bladder due to priming by the first stage affecting buoyancy of the flexible bladder.

6. The multi-stage pump system according to claim 5 wherein pressure of the second fluid drawn into the second stage is increased by hydraulic pumping due to inflation of the flexible bladder.

7. The multi-stage pump system according to claim 5 wherein pressure of the second fluid drawn into the second stage is increased by pressurising the cylinder with a gas or liquid concurrently with inflation of the flexible bladder.

8. The multi-stage pump system according to claim 1 wherein the first pressure generated by the first stage is substantially in the range of 4 psi to 40 psi.

9. The multi-stage pump system according to claim 1 wherein the second pressure generated by the second stage, including utilisation of inflation and deflation of the flexible bladder, is substantially in the range of 40 psi to 200 psi.

10. The multi-stage pump system according to claim 1 further including a third stage that is in fluid communication with at least the second stage, wherein the third stage drives a second reciprocating member through a stroke to further increase pressure.

11. The multi-stage pump system according to claim 10 wherein the third stage includes a flexible bladder to be partly or fully inflated and deflated.

12. The multi-stage pump system according to claim 11 wherein a pressure generated by the third stage, including utilisation of inflation and deflation of the flexible bladder of the third stage, is substantially in the range of 500 psi to 800 psi.

13. The multi-stage pump system according to claim 10 wherein through a connection means the first stage, second stage and third stage are in fluid communication.

14. The multi-stage pump system according to claim 13 wherein the connection means are flexible tubing.

15. A method of desalination using a multi-stage pump system, the multi-stage pump system comprising a first stage and a second stage, the second stage comprising a first reciprocating member, the method comprising:
 a. providing a first fluid at a first pressure from the first stage to prime the second stage, the second stage in fluid communication with the first stage;
 b. drawing a second fluid from a second fluid source via an inlet of the second stage when the first reciprocating member undergoes a stroke; and
 c. expelling the second fluid at a second pressure via an outlet of the second stage when the first reciprocating member completes the stroke, the second pressure greater than the first pressure,
 wherein, the second stage further includes a flexible bladder submerged in the second fluid source and the first reciprocating member is movable in response to a change in buoyancy of the flexible bladder as it is at least partially inflated and deflated using the first fluid.

16. The multi-stage pump system according to claim 3 wherein the reciprocating member includes a piston cylinder assembly configured as part of a scissor pump that is operable to move up and down due to the change in buoyancy of the flexible bladder.

17. The multi-stage pump system according to claim 1 wherein the first fluid at a first pressure is compressed air.

18. The multi-stage pump system according to claim 17 wherein the compressed air is generated in the first stage by pumping water up a substantially vertical pipe column to generate a positive air pressure for priming the second stage.

19. The multi-stage pump system according to claim 18 wherein downward movement of water in the pipe column generates a negative air pressure.

20. The multi-stage pump system according to claim 19 wherein the negative air pressure is used in a desalination system to draw water vapour from a vapourising chamber into at least one condensing chamber.

\* \* \* \* \*